US012671855B2

(12) United States Patent　　(10) Patent No.:　US 12,671,855 B2
Hu　　(45) Date of Patent:　Jun. 30, 2026

(54) MEDIA DATA PROCESSING METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/928,266

(22) Filed: Oct. 28, 2024

(65) Prior Publication Data

US 2025/0056073 A1　　Feb. 13, 2025

Related U.S. Application Data

(63) Continuation of application No. PCT/CN2023/079111, filed on Mar. 1, 2023.

(30) Foreign Application Priority Data

May 27, 2022　(CN) ........................ 202210586954.X

(51) Int. Cl.
　*H04N 21/236*　　(2011.01)
　*H04L 65/70*　　(2022.01)
(52) U.S. Cl.
　CPC ........... *H04N 21/236* (2013.01); *H04L 65/70* (2022.05)

(58) Field of Classification Search
　CPC .......... H04N 21/236; H04N 21/23418; H04N 21/2353; H04N 21/4728; H04N 19/66; H04N 19/70; H04N 19/46; H04N 21/6587; H04N 21/816; H04N 21/8456;
　　　　　　(Continued)

(56) References Cited

U.S. PATENT DOCUMENTS

2011/0026808 A1　2/2011　Kim et al.
2020/0257918 A1　8/2020　Liu
　　　　　　(Continued)

FOREIGN PATENT DOCUMENTS

CN　　103458238 A　　12/2013
CN　　112613528 A　　4/2021
CN　　114422791 A　*　4/2022　........... H04N 19/146
　　　　　　(Continued)

OTHER PUBLICATIONS

International Search Report issued Jun. 12, 2023 in International Application No. PCT/CN2023/079111.
　　　　　　(Continued)

*Primary Examiner* — Asmamaw G Tarko
(74) *Attorney, Agent, or Firm* — Sughrue Mion, PLLC

(57)　　ABSTRACT

A media data processing method, performed by a computer device, includes: acquiring point cloud media; determining saliency information of the point cloud media; encoding the point cloud media to acquire a point cloud code stream; and encapsulating the point cloud code stream and the saliency information into a media file, wherein the saliency information includes a saliency level parameter indicating a target range of the point cloud media, and wherein the target range includes at least one of a spatial range or a time range.

20 Claims, 7 Drawing Sheets

(58) Field of Classification Search
CPC ...... H04N 19/597; H04N 19/30; H04N 19/37;
H04N 19/42; H04L 65/70
USPC ....................................... 375/240.01, 240.16
See application file for complete search history.

(56)                     References Cited

U.S. PATENT DOCUMENTS

| | | | |
|---|---|---|---|
| 2021/0319593 A1 | 10/2021 | Flynn | |
| 2023/0215129 A1* | 7/2023 | Ninan | ...................... G06T 7/55 |
| | | | 382/190 |

FOREIGN PATENT DOCUMENTS

| | | | |
|---|---|---|---|
| CN | 115002470 A | 9/2022 | |
| WO | 2021/136877 A1 | 7/2021 | |
| WO | WO-2021210867 A1 * | 10/2021 | ........... H04N 13/172 |

OTHER PUBLICATIONS

Written Opinion issued Jun. 12, 2023 in International Application
No. PCT/CN2023/079111.
Aksu et al., "Technologies under consideration on carriage of V3C
data", 131. MPEG Meeting; Jun. 29, 2020-Jul. 3, 2020; Online;
(Motion Picture Expert Group or ISO/IEC JTC1/SC29/WG11), No.
n19425 Jul. 28, 2020 (Jul. 28, 2020), XP030288054, pp. 117.
European Communication dated Nov. 26, 2025 in Application No.
23810580.3.

* cited by examiner

| | | | |
|---|---|---|---|
| Sample 1: Reference saliency level parameter | Sample 2: Saliency level = 2 | Sample 3: Saliency level = 1 ... | Sample E: Reference saliency level parameter |

Determine saliency information of point cloud media; the saliency information including a saliency level parameter configured for indicating a target range of the point cloud media; and the target range including at least one of a spatial range or a time range    201

Encode the point cloud media to obtain a point cloud code stream    202

Encapsulate the point cloud code stream and the saliency information into a media file    203

Transmit transmission signaling for the media file to a client; the transmission signaling carries saliency information description data; the saliency information description data is configured for instructing the client to determine an obtaining order between different media sub-files in the media file when obtaining the media file in a streaming transmission mode; and the saliency information description data is generated based on the saliency information    204

FIG. 9

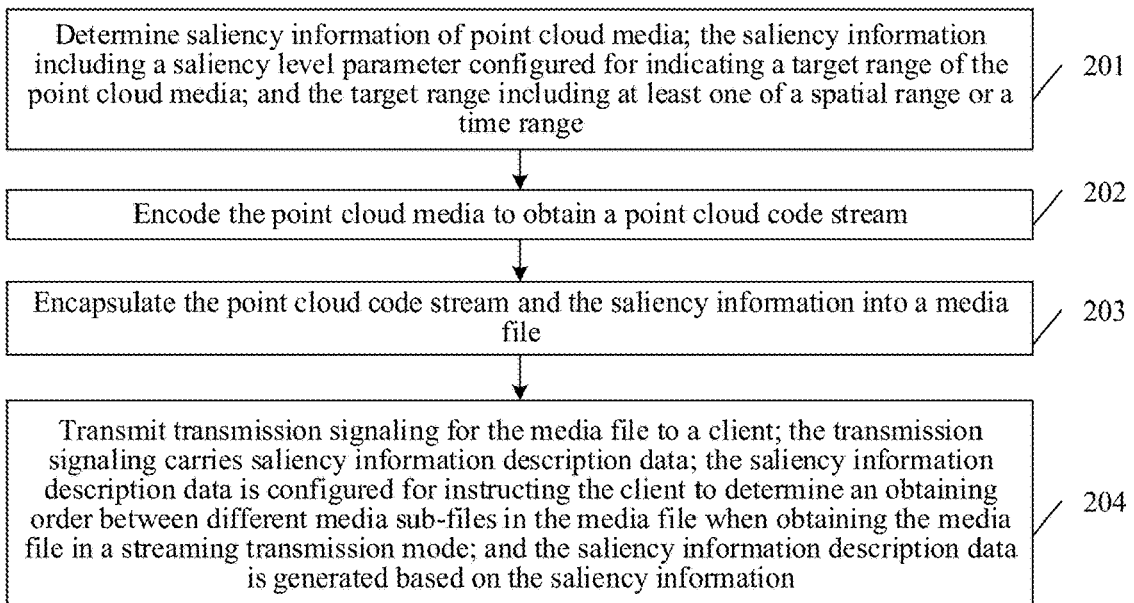

Spatial region 1
Saliency level = 2

Point cloud slice 0 | Point cloud slice 1

Point cloud slice 2 | Point cloud slice 3

Spatial region 2
Saliency level = 1

FIG. 10

Obtain a media file, and decapsulate the media file to obtain a point cloud code stream and saliency information of the point cloud media; the saliency information including a saliency level parameter configured for indicating a target range of the point cloud media; and the target range including at least one of a spatial range or a time range    301

Decode the point cloud code stream to obtain the point cloud media    302

FIG. 11

MEDIA DATA PROCESSING METHOD AND APPARATUS, DEVICE, AND READABLE STORAGE MEDIUM

CROSS-REFERENCE TO RELATED APPLICATIONS

This application is a continuation application of International Application No. PCT/CN2023/079111 filed on Mar. 1, 2023, which claims priority to Chinese Patent Application No. 202210586954.X, filed with the China National Intellectual Property Administration on May 27, 2022, the disclosures of each being incorporated by reference herein in their entireties.

FIELD

The disclosure relates to the field of computer technologies, and in particular, to a media data processing method and apparatus, a device, and a readable storage medium.

BACKGROUND

An immersive media refers to media content that can bring immersive experience to service objects. Point cloud media is immersive media.

In a related technology, a content consumption device decapsulates a point cloud file transmitted by a content production device, decodes the point cloud file to obtain point cloud media, and finally renders and presents the point cloud media. However, when the point cloud media is rendered, attention is paid only to the point cloud media itself. Therefore, not only rendering efficiency is low, but also a rendering effect is poor, and a presentation effect of the point cloud media may be reduced.

SUMMARY

Provided are a media data processing method and apparatus, a device, and a readable storage medium, capable of determining a rendering effect of a target range based on saliency information.

According to some embodiments, a media data processing method, performed by a computer device, includes: acquiring point cloud media; determining saliency information of the point cloud media; encoding the point cloud media to acquire a point cloud code stream; and encapsulating the point cloud code stream and the saliency information into a media file, wherein the saliency information includes a saliency level parameter indicating a target range of the point cloud media, and wherein the target range includes at least one of a spatial range or a time range.

According to some embodiments, a media data processing apparatus includes: at least one memory configured to store computer program code; and at least one processor configured to read the program code and operate as instructed by the program code, the program code including: acquiring code configured to cause at least one of the at least one processor to acquire point cloud media; determining code configured to cause at least one of the at least one processor to determine saliency information of the point cloud media; encoding code configured to cause at least one of the at least one processor to encode the point cloud media to obtain a point cloud stream; and encapsulating code configured to cause at least one of the at least one processor to encapsulate the point cloud code stream and the saliency information into a media file, wherein the saliency information includes a saliency level parameter indicating a target range of the point cloud media, and wherein the target range includes at least one of a spatial range or a time range.

According to some embodiments, a non-transitory computer readable storage medium, storing computer code which, when executed by at least one processor, causes the at least one processor to at least: acquire point cloud media; determine saliency information of the point cloud media; encode the point cloud media to obtain a point cloud stream; and encapsulate the point cloud code stream and the saliency information into a media file, wherein the saliency information includes a saliency level parameter indicating a target range of the point cloud media, and wherein the target range includes at least one of a spatial range or a time range.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 9 is a schematic flowchart of another media data processing method according to some embodiments.

FIG. 10 is a schematic diagram in which a saliency level parameter is related to a spatial region, and a saliency level parameter related to a spatial region does not change with time according to some embodiments.

FIG. 11 is a schematic flowchart of still another media data processing method according to some embodiments.

DESCRIPTION OF EMBODIMENTS

Figure 1:
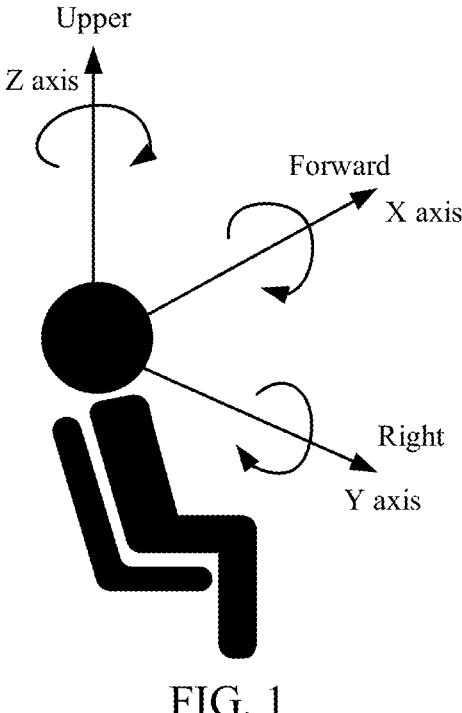
FIG. 1 is a schematic diagram of 3DoF according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

The following describes some technical terms related to some embodiments.

I. Immersive Media:

Immersive media is a media file that can provide immersive-experience media content, so that a service object immersed in the media content can obtain sensory experience such as visual and auditory experience in a real world. The immersive media may be classified into 3DoF media, 3DoF+media, and 6DoF media according to a degree of freedom (DoF) of a service object in consuming media content. Point cloud media may be 6DoF media. In some embodiments, a user (for example, a viewer) that consumes immersive media (for example, point cloud media) is collectively referred to as a service object.

II. Point Cloud:

A point cloud is a set of discrete points in space that are irregularly distributed and represent a spatial structure and a surface property of a three-dimensional object or scene. Each point in the point cloud has at least three-dimensional location information, and may further have color, material, or other information according to different application scenes. Each point in the point cloud may have the same quantity of additional properties.

The point cloud may flexibly and conveniently express a spatial structure and a surface property of a three-dimensional object or scene. Therefore, the point cloud has wide application, including a virtual reality (VR) game, computer aided design (CAD), a geography information system (GIS), an autonomous navigation system (ANS), a digital cultural heritage, free-view broadcasting, three-dimensional immersive remote presentation, and three-dimensional reconstruction of biological organs.

The point cloud is obtained mainly in the following ways: computer generation, 3-dimension (3D) laser scanning, 3D photogrammetry, and the like. A computer may generate a point cloud of a virtual three-dimensional object and scene. 3D scanning may obtain a point cloud of a static real-world three-dimensional object or scene, and may obtain a million-level point cloud per second. 3D photographing may obtain a point cloud of a three-dimensional object or scene in a dynamic real world, and may obtain tens of millions-level point cloud per second. In addition, in the medical field, a point cloud of a biological tissue organ may be obtained by means of magnetic resonance imaging (MRI), computed tomography (CT), and electromagnetic positioning information. These technologies reduce point cloud data obtaining costs and time periods, and improve data precision. Changes in a mode of obtaining point cloud data make it possible to obtain a large quantity of point cloud data. With large-scale accumulation of point cloud data, efficient storage, transmission, distribution, sharing and standardization of point cloud data are key to point cloud applications.

III. Track:

A track is a media data set in a media file encapsulation process, and consists of samples of multiple time sequences. A media file may consist of one or more tracks. For example, a media file may include a video media track, an audio media track, and a subtitle media track. Metadata information may also be used as a media type, and is included in a file in a form of a metadata media track, which is referred to as a metadata track for short.

IV. Sample:

A sample is an encapsulation unit in a media file encapsulation process, a track consists of a plurality of samples, and each sample corresponds to specific timestamp information. For example, a video media track may consist of many samples, and a sample is usually a video frame. In some embodiments, a sample in a point cloud media track may be a point cloud frame.

V. Sample Entry:

A sample entry is configured for indicating metadata information related to all samples in a track. For example, in a sample entry of a video track, metadata information related to decoder initialization is usually included.

VI. Point Cloud Slice:

A point cloud slice (point cloud strip) represents a set of syntax elements (such as geometric slices and property slices) of point cloud frame data based on partial or whole encoding.

VII. Spatial Tile Region:

is a hexahedron spatial tile region in a boundary spatial region of a point cloud frame, referred to as a spatial tile. One spatial tile consists of one or more point cloud slices, and there is no codec dependency relationship between spatial tiles.

VIII. Saliency and Saliency Detection:

Because a human visual system can naturally determine a most clear and prominent region in a current scene in a quick scan of a scene, a person is naturally attracted to prominent picture content when watching a picture. For a picture, the part that most attracts an observer's attention is a saliency region of the picture. For a picture, attractiveness of different regions of the picture to the observer varies, and a concept that represents the attractiveness of these regions to the observer is called saliency.

Saliency detection that represents a degree of visual attraction is of great importance to image processing and analysis. Human visual attention is an important mechanism in a process of obtaining and processing external information. It enables people to quickly screen important information and make perception have a selection capability. However, if this mechanism is combined with image processing, efficiency of an existing image processing and analysis method can be greatly improved. Saliency detection is proposed and developed based on this. Saliency detection is a technical means of preprocessing an image in the computer vision field, and is configured for searching for or identifying a saliency object in the image, which is an image region that is easily noticed by a human eye.

With development of a saliency detection model, saliency detection is also applied to other fields of image processing, such as image segmentation, image compression, and image recognition. Practicality of saliency detection is gradually recognized in continuous application. With emergence of immersive media, development of the saliency detection model also meets a new challenge. For example, for point cloud media, a point cloud frame of the point cloud media has departed from a category of an image, and how saliency detection and saliency classification are performed on points in a three-dimensional space has become the current newest research direction in the immersive media field.

IX. Degree of Freedom (DoF):

DoF refers to a degree of freedom of movement supported by a service object when watching immersive media (for example, point cloud media) and generating content interaction, and may include three degrees of freedom (3DoF), 3DoF+, and six degrees of freedom (6DoF). 3DoF refers to three degrees of freedom in which the head of the service object rotates around an x-axis, a y-axis, and a z-axis. 3DoF+ means that based on three degrees of freedom, the service object also has the freedom to perform limited movement along the x-axis, y-axis, and z-axis. 6DoF means that based on three degrees of freedom, the service object also has the freedom to perform free movement along the x-axis, y-axis, and z-axis.

X. ISO Based Media File Format (ISOBMFF):

A media file format based on an International Standard Organization (ISO) standard is an encapsulation standard of a media file. An ISOBMFF file is a Moving Picture Experts Group 4 (MP4) file.

XI. Dynamic Adaptive Streaming over HTTP (DASH): It is an adaptive bit rate technology, enabling high-quality streaming media to be transferred over the Internet by using a traditional Hyper Text Transfer Protocol (HTTP) network server.

XII. Media presentation description (MPD): is media presentation description signaling in DASH, and is configured for describing media segment information in a media file.

XIII. Representation: It is a combination of one or more media components in DASH. For example, a video file of a specific resolution may be considered as a representation.

XIV. Adaptation set: is a set of one or more video streams in DASH. One adaptation set may include multiple representations.

XV. Media segment: is a playable segment consistent with a specific media format. It may be necessary to cooperate with the preceding 0 or more segments and an initialization segment during playback.

Some embodiments relate to a data processing technology of immersive media. The following describes some concepts in a data processing process of immersive media. In some embodiments, immersive media is used as an example of point cloud media.

Referring to FIG. 1, FIG. 1 is a schematic diagram of 3DoF according to some embodiments. As shown in FIG. 1, 3DoF means that a service object consuming immersive media is fixed at a central point in three-dimensional space, and the head of the service object rotates along an X-axis, a Y-axis, and a Z-axis to view a picture provided by media content.

Figure 2:
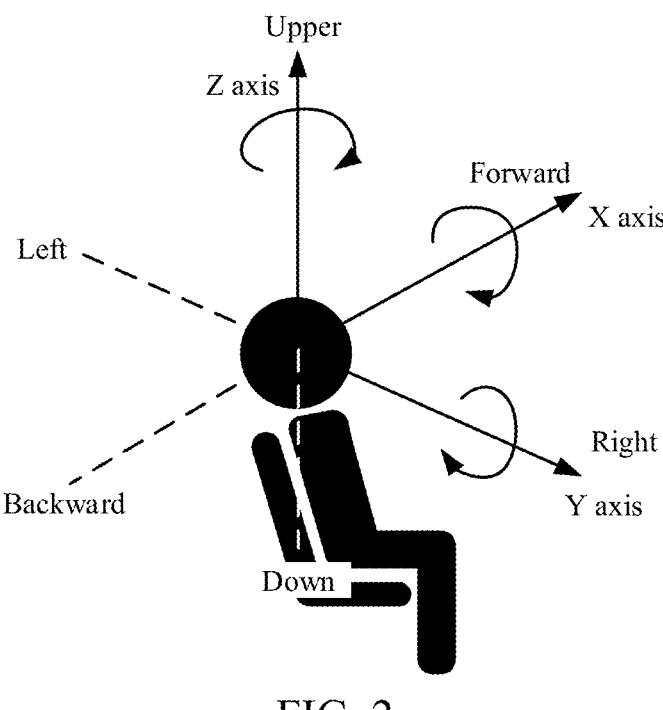
FIG. 2 is a schematic diagram of 3DoF+ according to some embodiments.

Referring to FIG. 2, FIG. 2 is a schematic diagram of 3DoF+ according to some embodiments. As shown in FIG. 2, 3DoF+ means that when a virtual scene provided by immersive media has depth information, a service object header may move, based on 3DoF, in limited space to view a picture provided by media content.

Figure 3:
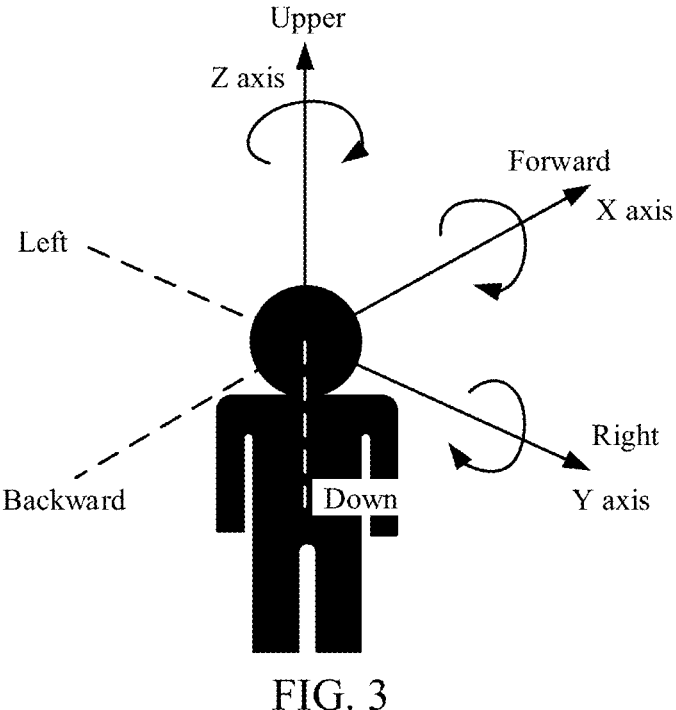
FIG. 3 is a schematic diagram of 6DoF according to some embodiments.

Referring to FIG. 3, FIG. 3 is a schematic diagram of 6DoF according to some embodiments. As shown in FIG. 3, 6DoF is divided into window 6DoF, omnidirectional 6DoF, and 6DoF, where the window 6DoF refers to limited rotational movement of a service object on the X-axis and the Y-axis, and limited translation on the Z-axis. For example, the service object cannot see a scene outside a window frame, and the service object cannot cross a window. The omnidirectional 6DoF refers to limited rotational movement of the service object on the X-axis, the Y-axis, and the Z-axis. For example, the service object cannot freely pass through three-dimensional 360-degree VR content in a restricted moving region. 6DoF means that the service object may move freely along the X-axis, the Y-axis, and the Z-axis on the basis of 3DoF. For example, the service object may move freely in three-dimensional 360-degree virtual reality (VR) content.

Figure 4:
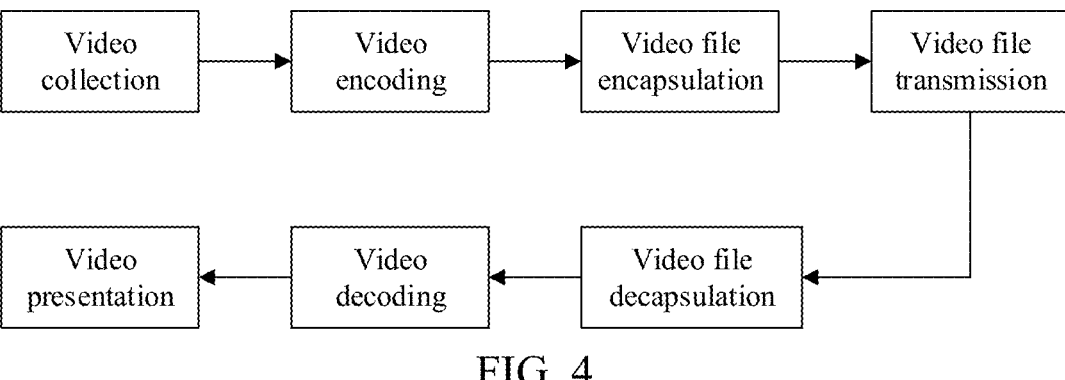
FIG. 4 is a schematic flowchart of collecting and consuming immersive media according to some embodiments.

Referring to FIG. 4, FIG. 4 is a schematic flowchart of collecting and consuming immersive media according to some embodiments. As shown in FIG. 4, a process for immersive media may include the following operations: video collection, video encoding, video file encapsulation, video file transmission, video file decapsulation, video decoding, and final video presentation.

Video collection is configured for converting an analog video into a digital video, and storing the digital video in a format of a digital video file. For example, video collection may convert video signals (for example, point cloud data) collected by multiple cameras from different angles into binary digital information, where binary digital information converted from a video signal is a binary data stream, and the binary digital information may also be referred to as a code stream or a bitstream of the video signal. Video encoding refers to converting a file of an original video format into a file of another video format by using a compression technology. From a perspective of a mode of obtaining a video signal, a video signal may be divided into two modes of photographing by a camera and generating by a computer. Because of different statistical characteristics, compression encoding modes corresponding to the video signal may also be different. A compression encoding mode may include an international video encoding standard High Efficiency Video Coding (HEVC/H.265), an international video encoding standard Versatile Video Coding (VVC/H.266), a national video encoding standard Audio Video Coding Standard (AVS), a third-generation video coding standard introduced by the AVS Standards Workgroup (AV3), and the like.

Based on video encoding, an encoded data stream (for example, a point cloud code stream) is to be encapsulated and transmitted to a service object. Video file encapsulation means that a compressed video code stream and an audio code stream are encoded according to an encapsulation format (or a container, or a file container), and stored in a file according to a specific format. A encapsulation format includes an Audio Video Interleaved format (AVI) or an ISOBMFF format. In some embodiments, the audio code stream and the video code stream are encapsulated in a file container in a file format such as ISOBMFF to form a media file (also referred to as an encapsulation file or a video file). The media file may include multiple tracks, for example, may include one video track, one audio track, and one caption track.

Based on executing the foregoing encoding process and the file encapsulation process, a content production device may transmit the media file to a client of a content consumption device. Based on performing an inverse operation such as decapsulation and decoding, the client may present final video content in the client. The media file may be sent to the client based on various transmission protocols. The transmission protocols herein may include but are not limited to: a DASH protocol, an HTTP Live Streaming (HLS)

protocol, a Smart Media Transport Protocol (SMTP), a Transmission Control Protocol (TCP), and the like.

A file decapsulation process of the client is reversed to the foregoing file encapsulation process, and the client may decapsulate the media file according to a file format at the time of encapsulation, to obtain an audio code stream and a video code stream. A decoding process of the client is also reversed to the encoding process. For example, the client may decode a video code stream to restore video content, and decode an audio code stream to restore audio content.

Figure 5:
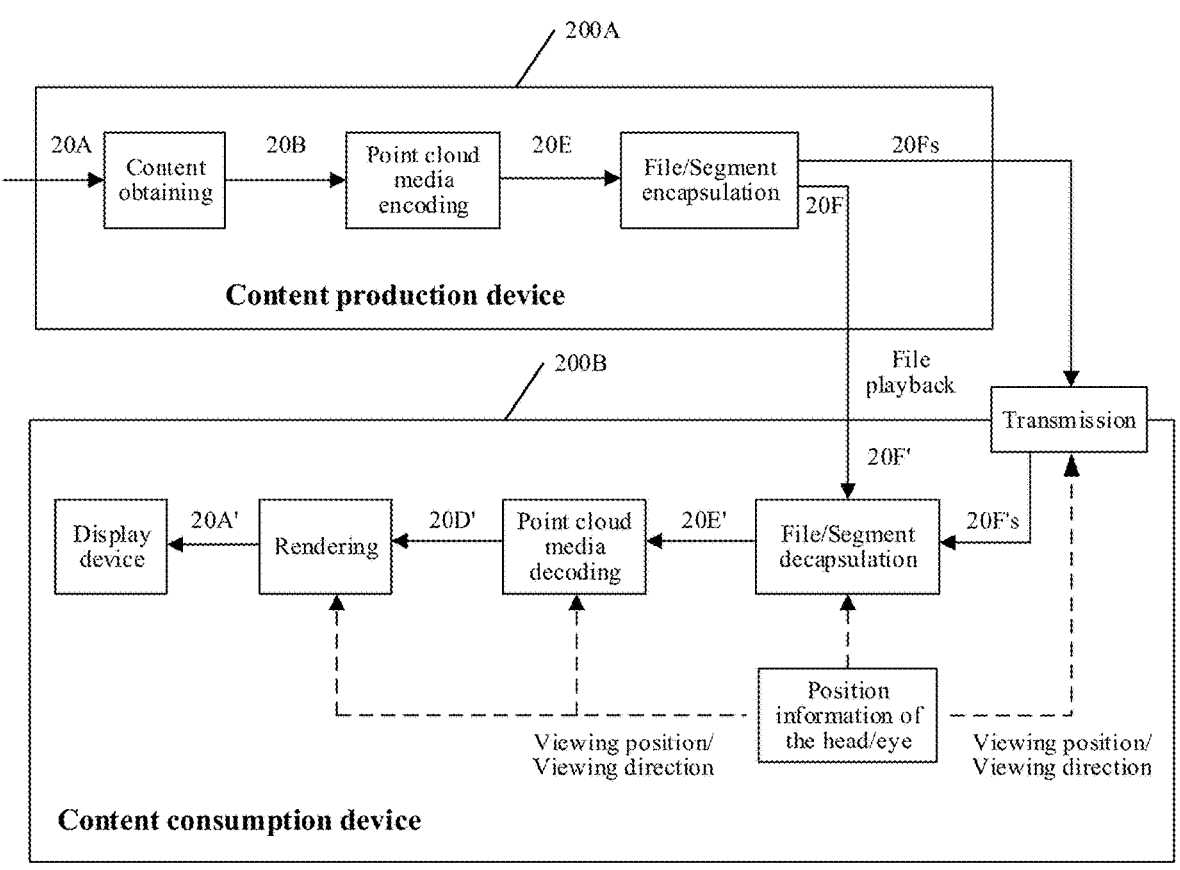
FIG. 5 is a schematic architecture diagram of an immersive media system according to some embodiments.

For case of understanding, referring to FIG. 5, FIG. 5 is a schematic architecture diagram of an immersive media system according to some embodiments. As shown in FIG. 5, the immersive media system may include a content production device (for example, a content production device 200A) and a content consumption device (for example, a content consumption device 200B). The content production device may refer to a computer device used by a provider of point cloud media (for example, a content producer of the point cloud media). The computer device may be a terminal (for example, a personal computer (PC), a smart mobile device (for example, a smartphone)), or a server. The server may be an independent physical server, or may be a server cluster or a distributed system formed by a plurality of physical servers, or may be a cloud server that provides a cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The content consumption device may be a computer device used by a user of the point cloud media (for example, a viewer of the point cloud media, for example, a service object). The computer device may be a terminal (such as a personal computer (PC), a smart mobile device (such as a smartphone), a VR device (such as a VR helmet and VR glasses), a smart home appliance, an in-vehicle terminal, and an aircraft). The computer device is integrated with a client. The content production device and the content consumption device may be directly or indirectly connected in a wired or wireless communication mode, which is not limited.

The client may be a client having a function of displaying data information such as a text, an image, an audio, and a video, including but not limited to a multimedia client (for example, a video client), a social client (for example, an instant messaging client), an information application (for example, a news client), an entertainment client (for example, a game client), a shopping client, an in-vehicle client, a browser, and the like. The client may be an independent client, or may be an embedded subclient integrated in a client (such as a social client), which is not limited herein.

A data processing technology related to immersive media may be implemented based on a cloud technology. For example, a cloud server is used as a content production device. The cloud technology is a hosting technology that unifies a series of resources, such as hardware, software, and a network, in a wide region network or a local region network, to implement computing, storage, processing, and sharing of data.

A data processing process of point cloud media includes a data processing process on a content production device side and a data processing process on a content consumption device side.

The data processing process on the content production device side mainly includes: (1) Media content obtaining and production process of point cloud media; and (2) Encoding and file encapsulation process of the point cloud media. The data processing process on the content consumption device side mainly includes: (1) File decapsulation and decoding process of point cloud media; and (2) Rendering process of the point cloud media. In addition, a point cloud media transmission process is involved between the content production device and the content consumption device. The transmission process may be performed based on various transmission protocols. The transmission protocols herein may include but are not limited to: a DASH protocol, an HLS protocol, an SMT protocol and a TCP protocol.

With reference to FIG. 5, each process involved in a data processing process of point cloud media is briefly described in the following.

I. Data Processing Process on the Content Production Device Side:

(1) Media Content Obtaining and Production Process of Point Cloud Media

1) A Process of Obtaining the Media Content of the Point Cloud Media.

The media content of the point cloud media is obtained by collecting a real-world sound-visual scene by a capture device. In one implementation, the capture device may refer to a hardware component disposed in the content production device, for example, the capture device refers to a microphone, a camera, a sensor, and the like of a terminal. In another implementation, the capture device may alternatively be a hardware apparatus connected to the content production device, for example, a camera connected to a server, and is configured to provide a media content obtaining service of the point cloud media for the content production device. The capture device may include but is not limited to: an audio device, a camera device, and a sensing device. The audio device may include an audio sensor, a microphone, and the like. The camera device may include a camera, a stereo camera, a light field camera, and the like. The sensing device may include a laser device, a radar device, and the like. There may be multiple capture devices, and these capture devices are deployed at specific positions in real space to capture audio content and video content at different angles within the space, and both captured audio content and video content are synchronized in time and space. In some embodiments, media content in three-dimensional space that is collected by a capture device deployed at a specific position and that is configured for providing multi-degree-of-freedom (such as 6DoF) viewing experience may be referred to as point cloud media.

For example, an example in which video content of the point cloud media is obtained is configured for description. As shown in FIG. 5, a visual scene 20A (for example, a real-world visual scene) may be captured by a group of camera arrays connected to a content production device 200A, or may be captured by an imaging device that is connected to the content production device 200A and that has multiple cameras and sensors. A collection result may be source point cloud data 20B (for example, the video content of the point cloud media).

2) Production Process of the Media Content of the Point Cloud Media.

The production process of the media content of the point cloud media in some embodiments may be understood as a content production process of the point cloud media, and content production of the point cloud media herein is mainly made of content in a form such as point cloud data photographed by cameras deployed at multiple locations or a camera array. For example, the content production device may convert the point cloud media from a three-dimensional representation to a two-dimensional representation.

In addition, a panoramic video may be captured by using the capture device. Based on the video being processed by the content production device and transmitted to the content consumption device for corresponding data processing, a service object on the content consumption device side is to view video information at 360 degrees by performing some specific actions (such as head rotation), and performing an unspecific action (such as moving the head) does not obtain a corresponding video change, and VR experience is poor. Therefore, additional depth information that matches the panoramic video is to be provided, so that the service object obtains better immersion and better VR experience. This relates to a 6DoF production technology. When the service object can move freely in an analog scene, it is referred to as 6DoF. When the video content of the point cloud media is produced by using the 6DoF production technology, a laser device, a radar device, and the like are configured for capturing point cloud data in space.

(2) Encoding and File Encapsulation Process of the Point Cloud Media.

Captured audio content may be directly encoded to form an audio code stream of the point cloud media. Captured video content may be encoded to obtain a video code stream of the point cloud media. If the 6DoF production technology is used, a specific encoding mode (such as a point cloud compression mode based on traditional video encoding) is to be configured for encoding in a video encoding process. The content production device encapsulates the audio code stream and the video code stream into a file container according to a file format (for example, ISOBMFF) of the point cloud media, to form a media file resource of the point cloud media, where the media file resource may be a media file of the point cloud media formed by a media file or a media segment. According to a file format of the point cloud media, media presentation description information (for example, MPD) is configured for recording metadata of the media file resource of the point cloud media. The metadata herein is a name of information related to presentation of the point cloud media. The metadata may include description information of media content, description information of a view window, signaling information related to presentation of media content, and the like. The content production device stores the media presentation description information and the media file resource generated based on the data processing process.

As shown in FIG. 5, the content production device 200A performs point cloud media encoding on one or more data frames in source point cloud data 20B, for example, uses geometry-based point cloud compression (G-PCC, where PCC is point cloud compression), so as to obtain an encoded point cloud code stream 20E (for example, a video code stream, for example, a G-PCC code stream). The content production device 200A may encapsulate one or more encoded code streams into a media file 20F for local playback according to a specific media file format (e.g., ISOBMFF), or encapsulate it into a segment sequence 20F$_s$ for streaming transmission. In addition, a file encapsulator in the content production device 200A may also add related metadata to the media file 20F or the segment sequence 20F$_s$. Further, the content production device 200A may transmit the segment sequence 20F$_s$ to the content consumption device 200B by using a specific transmission mechanism (such as DASH or SMT), or transmit the media file 20F to the content consumption device 200B. In some implementations, the content consumption device 200B may be a player.

II. Data Processing Process on the Content Consumption Device Side:

(3) File Decapsulation and Decoding Process of Point Cloud Media

The content consumption device may obtain the media file resource and the corresponding media presentation description information of the point cloud media from the content production device dynamically by means of recommendation by the content production device or according to a service object requirement on the content consumption device side. For example, the content consumption device may determine a viewing direction and a viewing location of the service object according to head/eye location information of the service object, and request to obtain the corresponding media file resource from the content production device based on determined viewing direction and viewing location dynamics. The media file resource and the media presentation description information are transmitted to the content consumption device by using a transmission mechanism (such as DASH and SMT). The file decapsulation process on the content consumption device side is reversed to the file encapsulation process on the content production device side. The content consumption device decapsulates the media file resource according to the file format (for example, ISOBMFF) of the point cloud media to obtain the audio code stream and the video code stream. The decoding process on the content consumption device side is reversed to the encoding process on the content production device side. The content consumption device performs audio decoding on the audio code stream to restore the audio content. The content consumption device decodes the video code stream to restore the video content.

For example, as shown in FIG. 5, the media file 20F outputted by the file encapsulator in the content production device 200A is the same as a media file 20F' inputted to a file decapsulator in the content consumption device 200B. The file decapsulator performs file decapsulation processing on the media file 20F' or a received segment sequence 20F'$s$, extracts an encoded point cloud code stream 20E', parses corresponding metadata, and may perform point cloud media decoding on the point cloud code stream 20E' to obtain a decoded video signal 20D', and may generate point cloud data (for example, the restored video content) from the video signal 20D'. The media file 20F and the media file 20F' may include a definition of a track format, which may contain constraints on a stream included in a sample on a track.

(4) Rendering Process of the Point Cloud Media.

The content consumption device renders, according to metadata related to rendering in the media presentation description information corresponding to the media file resource, audio content obtained by means of audio decoding and video content obtained by means of video decoding. Based on rendering being completed, playback output of the content is implemented.

An immersive media system supports a data box. The data box refers to a data block or object that includes metadata, for example, the data box includes metadata of corresponding media content. In an actual application, the content production device may instruct, by using the data box, the content consumption device to consume the media file of the point cloud media. The point cloud media may include multiple data boxes, for example, an ISOBMFF box that includes metadata configured for describing corresponding information when a file is encapsulated. In some embodiments, the ISOBMFF data box includes metadata configured for indicating saliency information of the point cloud media.

It can be learned that the content consumption device may dynamically obtain, from the content production device, the media file resource corresponding to the point cloud media. Because the media file resource is obtained based on the content production device encoding and encapsulating the captured audio and video content, based on receiving the media file resource returned by the content production device, the content consumption device is to decapsulate the media file resource to obtain the corresponding audio and video code streams, and decode the audio and video code streams to finally present the decoded audio and video content to the service object. The point cloud media herein may include but is not limited to video-based point cloud compression (VPCC) point cloud media, and geometry-based point cloud compression (GPCC) point cloud media.

Saliency is of great importance to image processing and analysis, and can greatly improve efficiency of image processing and analysis. Saliency information may include a saliency level configured for indicating a region in an image. In some point cloud media, although a saliency level corresponding to each point cloud frame changes, a saliency level of the entire frame of the point cloud frame does not change. In this case, the saliency information is not to be associated with a spatial region of the point cloud frame. In some point cloud media, spatial regions with different saliency levels exist in the point cloud frame, but the saliency levels do not change with time, for example, the same saliency level exists in the spatial region corresponding to each frame. For example, point cloud media 100 includes 100 point cloud frames, and each point cloud frame may be divided into two spatial regions, where a first spatial region in a first point cloud frame, a first spatial region in a second point cloud frame, . . . , and a first spatial region in a 100th point cloud frame are respectively corresponding to a saliency level parameter 2; and a second spatial region in the first point cloud frame, a second spatial region in the second point cloud frame, . . . , and a second spatial region in the 100th point cloud frame are respectively corresponding to a saliency level parameter 1. In this case, the saliency level is not to be associated with time, and is to be associated with a spatial range. In some point cloud media, the saliency level also changes with time and space. In this case, the saliency level is to be associated with a spatial region of a point cloud frame.

Based on the foregoing, according to whether the saliency information changes with space and time, some embodiments provide saliency information indicating different ranges (including a spatial range and a time range), so that precision of the saliency information can be improved. Therefore, when point cloud media is applied, more scenes, such as an encoding scene, a transmission scene, and a rendering scene of the point cloud media, can be met by using high precision saliency information.

In some embodiments, based on obtaining the point cloud media, the content production device may determine saliency information of the point cloud media, where saliency information includes a saliency level parameter configured for indicating a target range (at least one of a time range or a spatial range); and encodes the point cloud media to obtain a point cloud code stream, and encapsulates the point cloud code stream and the saliency information into a media file. In some embodiments, the saliency information may include one or more saliency level parameters. A total quantity of saliency level parameters is not limited herein, and the total quantity of saliency level parameters is determined according to actually applied point cloud media.

In some embodiments, the saliency information in the media file may indicate the saliency level parameter corresponding to the target range. Therefore, subsequently, the content consumption device can determine a rendering effect of the target range based on the saliency information in a scene in which the point cloud media is rendered and presented, thereby optimizing a presentation effect of the point cloud media.

The method provided in some embodiments may be applied to stages such as a server end (for example, the content production device side), a player end (for example, the content consumption device side), and an intermediate node (for example, a smart media transport (SMT) receiving entity and an SMT transmitting entity) of the immersive media system. For a process in which the content production device determines the saliency information of the point cloud media, encodes the point cloud media to obtain the point cloud code stream, encapsulates the point cloud code stream and the saliency information into the media file, and a process in which the content consumption device determines the rendering effect of the target range when rendering the point cloud media based on the saliency information in the media file, refer to descriptions in some embodiments corresponding to FIG. 6 to FIG. 11.

Figure 6:
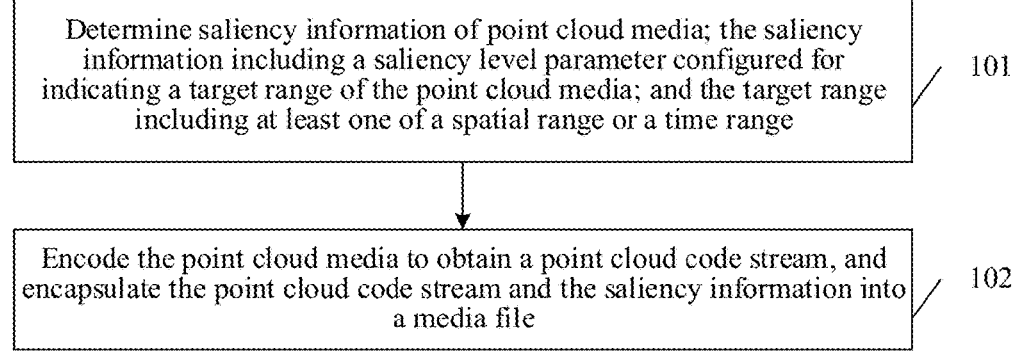
FIG. 6 is a schematic flowchart of a media data processing method according to some embodiments.

Further, referring to FIG. 6, FIG. 6 is a schematic flowchart of a media data processing method according to some embodiments. The method may be performed by a content production device (for example, the content production device 200A in some embodiments corresponding to FIG. 5) in an immersive media system. For example, the content production device may be a server. In some embodiments, execution by the server is used as an example for description. The method may include at least the following operations 101 and 102:

Operation 101: Determine saliency information of point cloud media; the saliency information including a saliency level parameter configured for indicating a target range of the point cloud media; and the target range including at least one of a spatial range or a time range.

In some embodiments, for an obtaining process and a production process of the point cloud media, refer to the foregoing description in FIG. 5. The saliency information in some embodiments may include two types of information. One type of information is saliency algorithm information, for example, information for obtaining a saliency level parameter. In some embodiments, an algorithm for obtaining the saliency level parameter is not limited, and may be set according to an actual application scene. The other type of information is a saliency level parameter configured for indicating a target range.

Saliency level parameters corresponding to different point cloud media is to be associated with different ranges. For example, saliency level parameters corresponding to some point cloud media only change with time. In this case, the saliency level parameters is not to be associated with a spatial region. Saliency level parameters corresponding to some point cloud media change only with space. In this case, the saliency level parameters is not to be associated with a point cloud frame. Saliency level parameters corresponding to some point cloud media change with time and space. Therefore, some embodiments provide a saliency information indication method for immersive media, including point cloud media. The following three modes are performed at a file encapsulation layer and a signaling transmission layer in the method:

1. Define saliency information configured for indicating different ranges (including a spatial range and a time range);

2. Define different types of saliency information obtaining algorithms; and

3. Associate saliency information with spatial information at the signaling transmission layer.

By performing the foregoing three modes, saliency information of different spatial regions and different point cloud frames in the point cloud media can be more flexibly determined, so as to meet more point cloud application scenes, so that a server can perform encoding optimization according to the saliency information, and a client can perform transmission optimization according to the saliency information.

Figures 7, 8:
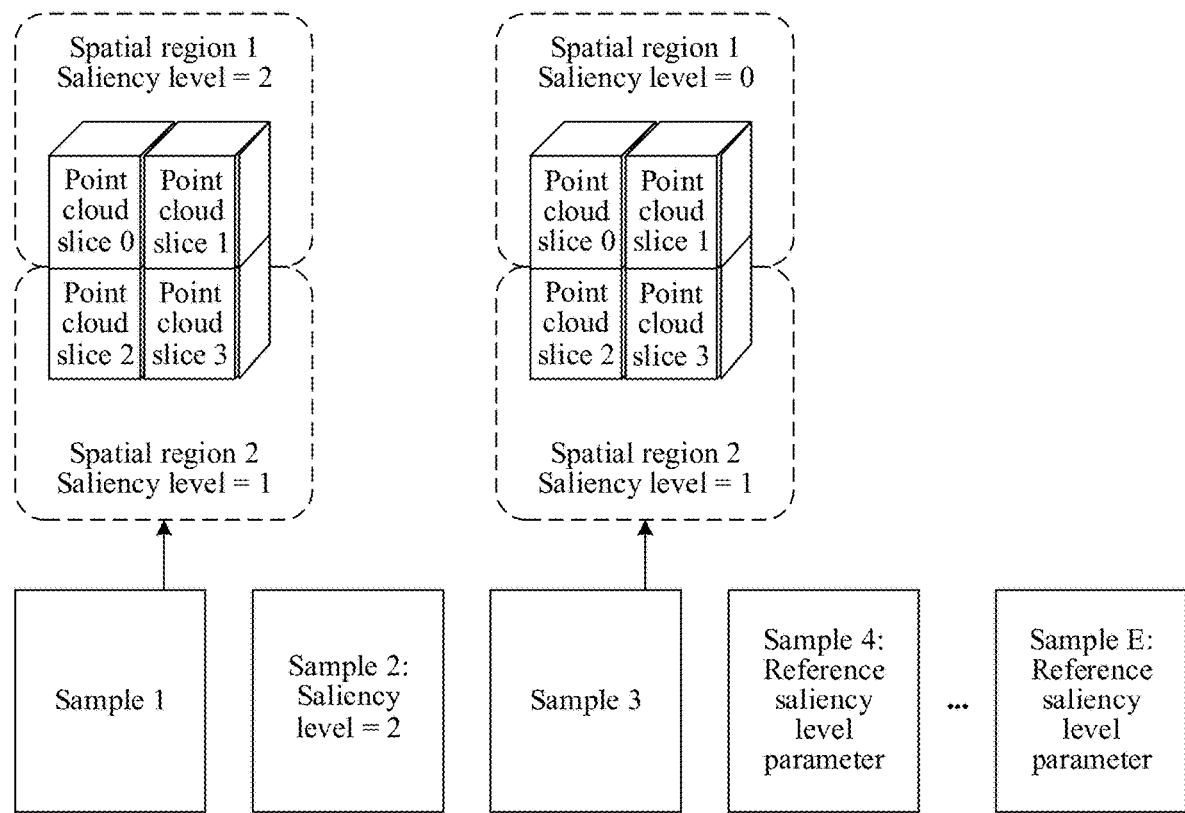
FIG. 7 is a schematic diagram in which a saliency level parameter is only related to time and not related to a spatial region according to some embodiments.
FIG. 8 is a schematic diagram in which a saliency level parameter is related to a spatial region, and a saliency level parameter of the spatial region changes with time according to some embodiments.

The point cloud media may include first point cloud media, the first point cloud media includes E point cloud frames, and E is a positive integer. In a point cloud track corresponding to the point cloud media, one point cloud frame may be referred to as one sample. Referring to FIG. 7, FIG. 7 is a schematic diagram in which a saliency level parameter is only related to time and not related to a spatial region according to some embodiments. As shown in FIG. 7, a sample 1 refers to a sample (for example, a point cloud frame) whose sequence number is 1 according to a time sequence in the first point cloud media, a sample 2 refers to a sample whose sequence number is 2 according to the time sequence in the first point cloud media, a sample 3 refers to a sample whose sequence number is 3 according to the time sequence in the first point cloud media, . . . , and a sample E is a sample whose sequence number is E according to the time sequence in the first point cloud media. According to content of the first point cloud media, the server may define saliency information of each region of the first point cloud media, where a saliency level of the entire sample 1 is a reference saliency level parameter. The immersive media system may preset the reference saliency level parameter. In some embodiments, a value of the reference saliency level parameter is not limited, and may be set according to an actual application scene. A saliency level parameter of the entire sample 2 is 2, a saliency level parameter of the entire sample 3 is 1, . . . , and a saliency level parameter of the entire sample E is a reference saliency level parameter.

A larger saliency level parameter indicates higher saliency. Therefore, in the first point cloud media, the sample 2 is a sample with the highest saliency (for example, a point cloud frame), the sample 3 is a sample with the second highest saliency, and the rest samples only have reference saliency (it is assumed that the reference saliency level parameter is 0). Clearly, in the first point cloud media, the saliency level parameter is only related to time and not related to a spatial region. Therefore, FIG. 5 shows a saliency level parameter of a point cloud frame level, and the server may generate a saliency information metadata track to indicate the saliency information, or may generate a saliency information sample group to indicate the saliency information. For a process of indicating the saliency information, refer to the following description of a saliency information data box and a saliency information metadata track in operation 102.

The point cloud media may include second point cloud media, and the second point cloud media includes one or more point cloud frames (for example, E point cloud frames). Referring to FIG. 8, FIG. 8 is a schematic diagram in which a saliency level parameter is related to a spatial region, and a saliency level parameter of the spatial region changes with time according to some embodiments. For meanings of a sample 1 to a sample E in FIG. 8, refer to the description in FIG. 7. According to content of the second point cloud media, the server may define saliency information of each region of the second point cloud media, where saliency levels corresponding to a sample 1, a sample 2, a sample 3, a sample 4, . . . , and a sample E are not completely the same, for example, the saliency level parameter of the second point cloud media changes with time. In addition, there are some point cloud frames whose internal space regions also correspond to different saliency level parameters, for example, the saliency level parameters also change in the spatial region.

As shown in FIG. 8, a saliency level parameter of the entire sample 1 is a reference saliency level parameter. The meaning of the reference saliency level parameter in described in FIG. 7, a spatial region corresponding to the sample 1 may be divided into two spatial regions, where a saliency level parameter corresponding to the first spatial region (referred to as a spatial region 1 for short) in the sample 1 is 2 and includes two point cloud slices, and point cloud slice identifiers respectively corresponding to the two point cloud slices include a point cloud slice 0 and a point cloud slice 1. A saliency level parameter corresponding to the second spatial region (referred to as a spatial region 2 for short) in the sample 1 is 1, and the second spatial region includes two point cloud slices, and point cloud slice identifiers respectively corresponding to the two point cloud slices include a point cloud slice 2 and a point cloud slice 3. In the sample 1, the saliency of the first spatial region is higher than that of the second spatial region.

As shown in FIG. 8, a saliency level parameter of the entire sample 2 is 2, and internal space of the sample 2 is not divided. A saliency level parameter of the entire sample 3 is the reference saliency level parameter, and a spatial region corresponding to the sample 3 may be divided into two spatial regions, where a saliency level parameter corresponding to the first spatial region (referred to as a spatial region 1 for short) in the sample 3 is 0 and includes two point cloud slices, and point cloud slice identifiers respectively corresponding to the two point cloud slices include a point cloud slice 0 and a point cloud slice 1. A saliency level parameter corresponding to the second spatial region (referred to as a spatial region 2 for short) in the sample 3 is 1, and the second spatial region includes two point cloud slices, and point cloud slice identifiers respectively corresponding to the two point cloud slices include a point cloud slice 2 and a point cloud slice 3. In the sample 3, the saliency of the first spatial region is lower than that of the second spatial region.

As shown in FIG. 8, saliency level parameters respectively corresponding to the sample 4, . . . , and the sample E are all reference saliency level parameters. Therefore, in the second point cloud media, the sample 2 is a sample with the highest saliency (for example, a point cloud frame), there is a spatial region with the highest saliency and a spatial region with the second highest saliency in the sample 1, there is a spatial region with the second highest saliency in the sample 3, and there is only the reference saliency level parameter in the rest samples (it is assumed that the reference saliency level parameter is 0). Clearly, in the second point cloud media, the saliency level parameter is related to both time and the spatial region, so that the server can generate a saliency information metadata track to indicate saliency information, or can generate a saliency information sample group to indicate the saliency information. For a process of indicating the saliency information, refer to the following description of a saliency information data box and a saliency information metadata track in operation 102.

The point cloud media may include third point cloud media. A saliency level parameter corresponding to the third point cloud media may be only related to a spatial region, and is not related to time. Some embodiments do not currently describe the third point cloud media. Refer to the following description in some embodiments corresponding to FIG. 9.

Operation 102: Encode the point cloud media to obtain a point cloud code stream, and encapsulate the point cloud code stream and the saliency information into a media file.

In some embodiments, in a case that the media file includes a saliency information metadata track configured for indicating the saliency information, the target range includes the time range; the saliency information metadata track includes E sample sequence numbers associated with the saliency information; one sample sequence number corresponds to one point cloud frame; the point cloud media includes E point cloud frames; and E is a positive integer.

The saliency information metadata track includes a sample sequence number $F_g$; g is a positive integer and g is less than or equal to E; the time range includes a point cloud frame corresponding to the sample sequence number $F_g$; the saliency information metadata track includes a saliency level indication field for the sample sequence number $F_g$; in a case that a field value of the saliency level indication field is a fourth indication value, a saliency level associated with the sample sequence number $F_g$ is determined by a reference saliency level parameter; the reference saliency level parameter belongs to a saliency level parameter in the saliency information; in a case that the field value of the saliency level indication field is a fifth indication value, the saliency level associated with the sample sequence number $F_g$ is determined by a saliency information data structure; and the fifth indication value is different from the fourth indication value.

In a case that the field value of the saliency level indication field is the fourth indication value, the reference saliency level parameter is configured for indicating a saliency level of a time range; the time range is a point cloud frame corresponding to the sample sequence number $F_g$; the saliency information metadata track further includes an effective range indication field whose field value for the sample sequence number $F_g$ is a sixth indication value; and the sixth indication value represents that the reference saliency level parameter takes effect in the saliency information metadata track.

In a case that the field value of the saliency level indication field is the fifth indication value, the saliency information metadata track further includes an effective range indication field for the sample sequence number $F_g$; in a case that a field value of the effective range indication field is a sixth indication value, the saliency level associated with the sample sequence number $F_g$ takes effect in the saliency information metadata track; in a case that the field value of the effective range indication field is a seventh indication value, the saliency level associated with the sample sequence number $F_g$ takes effect in the point cloud frame corresponding to the sample sequence number Fe; and the seventh indication value is different from the sixth indication value.

In a case that the field value of the effective range indication field is the seventh indication value, the saliency information metadata track further includes a sample saliency level field for the sample sequence number $F_g$; and the sample saliency level field is configured for indicating a saliency level parameter of the point cloud frame corresponding to the sample sequence number $F_g$.

In a case that the field value of the saliency level indication field is the fifth indication value, the saliency information metadata track further includes a data structure quantity field whose field value for the sample sequence number $F_g$ is T; the data structure quantity field is configured for indicating a total quantity of saliency information data structures; and T is a positive integer.

T saliency information data structures include a saliency information data structure $U_v$, v is a positive integer, and v is less than or equal to T; the saliency information data structure $U_v$ includes a saliency level field whose field value is a saliency level parameter $W_v$ and a target range indication field; the saliency level parameter $W_v$ belongs to a saliency level parameter in the saliency information; in a case that a field value of the target range indication field is a first indication value, the saliency level parameter $W_v$ is configured for indicating a saliency level of a spatial region in the point cloud frame corresponding to the sample sequence number $F_g$; in a case that the field value of the target range indication field is an eighth indication value, the saliency level parameter $W_v$ is configured for indicating the saliency level of the point cloud frame corresponding to the sample sequence number $F_g$; and the eighth indication value is different from the first indication value.

In a case that T is a positive integer greater than 1, the saliency information data structure includes a saliency level field and a target range indication field whose field value is the first indication value; a field value of the saliency level field belongs to a saliency level parameter in the saliency information; and the first indication value represents that the field value of the saliency level field is configured for indicating a saliency level of a spatial region in the point cloud frame corresponding to the sample sequence number $F_g$.

A sample entry of the saliency information metadata track includes a saliency information data box; the saliency information data box includes a saliency algorithm type field; and the saliency algorithm type field is configured for indicating a determined algorithm type of the saliency information.

In some embodiments, in a case that the media file includes Z saliency information sample groups configured for indicating the saliency information, the target range includes the time range; a total quantity of sample sequence numbers separately included in the Z saliency information sample groups is less than or equal to H, and the sample sequence numbers separately included in the Z saliency information sample groups are different from each other; one sample sequence number is configured for indicating one point cloud frame; the media file includes H point cloud frames; and H is a positive integer, Z is a positive integer, and Z is less than H.

The Z saliency information sample groups include a saliency information sample group $K_m$; m is a positive integer and m is less than or equal to Z; the time range includes a point cloud frame corresponding to the saliency information sample group $K_m$; the point cloud frame corresponding to the saliency information sample group $K_m$ belongs to the H point cloud frames; the saliency information sample group $K_m$ includes an effective range indication field and a data structure quantity field whose field value is 1; the data structure quantity field is configured for indicating a total quantity of saliency information data structures; and I is a positive integer; I saliency information data structures are configured for indicating a saliency level associated with the saliency information sample group $K_m$; in a case that a field value of the effective range indication field is a sixth indication value, the saliency level associated with the saliency information sample group $K_m$ takes effect in a point cloud track corresponding to the media file; in a case that the field value of the effective range indication field is a seventh indication value, the saliency level associated with the saliency information sample group $K_m$ takes effect within the saliency information sample group $K_m$; and the seventh indication value is different from the sixth indication value.

In a case that the field value of the effective range indication field is the seventh indication value, the saliency information sample group $K_m$ further includes a sample saliency level field; and the sample saliency level field is configured for indicating a saliency level parameter of the point cloud frame corresponding to the saliency information sample group $K_m$.

The I saliency information data structures include a saliency information data structure $J_n$, n is a positive integer, and n is less than or equal to I; the saliency information data structure $J_n$ includes a saliency level field whose field value is a saliency level parameter $L_n$ and a target range indication field; the saliency level parameter $L_n$ belongs to a saliency level parameter in the saliency information; in a case that a field value of the target range indication field is a first indication value, the saliency level parameter $L_n$ is config-ured for indicating a saliency level of a spatial region in the point cloud frame corresponding to the saliency information sample group $K_m$; in a case that the field value of the target range indication field is an eighth indication value, the saliency level parameter $L_n$ is configured for indicating a saliency level of the point cloud frame corresponding to the saliency information sample group $K_m$; and the eighth indication value is different from the first indication value.

For a process of encoding the point cloud media to obtain the point cloud code stream, refer to the foregoing descrip-tion in some embodiments corresponding to FIG. 5. In some embodiments, the server side may perform encoding opti-mization on the point cloud media according to the saliency information in the point cloud media, so as to improve encoding efficiency or a presentation effect. The operation may be performed in a point cloud media production phase, or may be performed in a re-encoding and encapsulation phase of the point cloud media based on point cloud media production being completed. For an optimization encoding process, refer to the following description in some embodi-ments corresponding to FIG. 9.

It may be learned from operation 101 that the server may define saliency information of each region of the immersive media according to the content of the immersive media (point cloud media is used as an example), which may include: a) defining an algorithm type of the saliency level according to a mode of obtaining the saliency level; and b) indicating saliency information of different ranges (includ-ing a spatial range and a time range) according to whether the saliency level changes with space and time. Therefore, in some embodiments, several descriptive fields are added to a system layer, including field extensions at the file encapsu-lation layer and the transmission signaling layer, to support this implementation operation. In some embodiments, a mode of extending an ISOBMFF data box is used as an example to define a saliency information indication method of point cloud media. For the field extension at the trans-mission signaling layer, refer to the description of DASH signaling and SMT signaling in FIG. 9 below.

In some embodiments, a saliency information data struc-ture may be configured for providing the saliency informa-tion of the point cloud media. Refer to Table 1. Table 1 is configured for indicating syntax of the saliency information data structure provided in some embodiments.

TABLE 1

```
aligned(8) class SaliencyInfoStruct( ){
    unsigned int(8) saliency_level;
    unsigned int(1) spatial_info_flag;
    bit(7) reserved
    if(spatial_info_flag == 1) {
        unsigned int(1) region_id_ref_flag;
        unsigned int(1) slice_info_flag;
        unsigned int(1) tile_info_flag;
        unsigned int(5) reserved;
        if(region_id_ref_flag == 1)
            unsigned int(16) spatial_region_id;
        else{
            3DPoint anchor_point( );
            CuboidRegionStruct bounding_info( );
        }
        if(slice_info_flag==1) {
            unsigned int(16) num_slices;
            for (j=0; j < num_slices; j++) {
                unsigned int(16) slice_id;
            }
        }
        if(tile_info_flag==1) {
            unsigned int(16) num_tiles;
            for (j=0; j < num_tiles; j++) {
                unsigned int(16) tile_id;
            }
        }
    }
}
```

Semantics of the syntax shown in the foregoing Table 1 is as follows: saliency_level is a saliency level field, and a value is an 8-bit unsigned integer, indicating a saliency level parameter. A larger value of the field indicates higher saliency. spatial_info_flag is a target range indication field, and a value is a 1-bit unsigned integer. When the value of the field is a first indication value (for example, 1 in Table 1), the saliency level parameter is a saliency level of a spatial region in a point cloud frame. When the value of the field is an eighth indication value (for example, 0), the saliency level parameter is a saliency level of an entire point cloud frame. In some embodiments, values of the first indication value and the eighth indication value are not limited, provided that the two indication values are different.

In Table 1, region_id_ref_flag is a spatial range indication field, and a value is a 1-bit unsigned integer. When the value of the field is a second indication value (for example, 1 in Table 1), a spatial region associated with a saliency level parameter is indexed by an identifier of the spatial region. When the value of the field is a third indication value (for example, 0), a spatial region associated with a saliency level is indicated by a spatial information-related data structure (for example, spatial region location information). In some embodiments, values of the second indication value and the third indication value are not limited, provided that the two indication values are different.

In Table 1, spatial_region_id is a spatial region identifier field, and a value is a 16-bit unsigned integer, indicating a spatial region identifier corresponding to a spatial region associated with a saliency level parameter. anchor_point indicates anchor coordinates of a spatial region, and bound-ing_info indicates length, width, and height information of the spatial region.

In Table 1, slice_info_flag is a point cloud slice informa-tion field, and a value is a 1-bit unsigned integer. When the value of the field is a first information value (for example, 1 in Table 1), a spatial region associated with a saliency level parameter is indicated, and one or more point cloud slices (referred to as associated point cloud slices) are associated. When the value of this field is a second information value (for example, 0), a spatial region associated with a saliency level is indicated, and there is no point cloud slice related thereto. In some embodiments, values of the first information value and the second information value are not limited, provided that the two information values are different.

In Table 1, num_slices is a point cloud slice quantity field, and a value is a 16-bit unsigned integer, indicating a quantity of point cloud slices associated with a spatial region, for example, a total quantity of associated point cloud slices. slice_id is a point cloud slice identifier field, and a value is a 16-bit unsigned integer, indicating a point cloud slice identifier of an associated point cloud slice.

In Table 1, tile_info_flag is a spatial tile information field, and a value is a 1-bit unsigned integer. When the value of this field is a third information value (for example, 1 in Table 1), a spatial region associated with a saliency level is represented, and one or more point cloud spatial tiles (referred to as associated spatial tiles) are associated. When the value of this field is a fourth information value (for example, 0), a spatial region associated with a saliency level is associated, and there is no point cloud spatial tile related thereto. In some embodiments, values of the third information value and the fourth information value are not limited, provided that the two information values are different.

In Table 1, num_tiles is a spatial tile information field, and a value is a 16-bit unsigned integer, indicating a quantity of spatial tiles associated with a spatial region, for example, a total quantity of associated spatial tiles. tile_id is a spatial tile identifier field, and a value is a 16-bit unsigned integer, indicating a spatial tile identifier of an associated spatial tile. A spatial region indicated by the saliency level parameter may be associated with any one of a tile or a slice.

When the spatial region indicated by the index saliency level parameter is indexed by using the spatial region identifier, a dynamic change of the spatial region corresponding to the spatial region identifier in the spatial range does not affect a static indication of the saliency level parameter.

In some embodiments, the saliency level parameter of the point cloud media being only related to space but not related to time is temporarily not described. When the saliency level of the point cloud media is related to time (including only related to time, and related to both time and space), an implementation is to indicate saliency information that changes with time in a saliency information metadata track. Referring to Table 2, Table 2 is configured for indicating a syntax of a saliency information metadata track structure according to some embodiments.

TABLE 2

```
aligned(8) class DynamicSaliencyInfoSampleEntry
    extends MetaDataSampleEntry('dsai')
{
    SaliencyInfoBox( );
}
aligned(8) DynamicSaliencyInfoSample( ) {
    unsigned int(1) default_saliency_flag;
    unsigned int(1) unified_saliency_level;
    bit(6) reserved;
    if(default_saliency_flag == 0){
        if(unified_saliency_level = 0){
            unsigned_int(8) sample_saliency_level;
        }
        unsigned int(16) num_saliency_struct;
        for (i=0; i < num_saliency_struct; i++) {
            SaliencyInfoStruct( );
        }
    }
}
```

A saliency information metadata track (also referred to as a dynamic saliency information metadata track, DSAI for short) includes a sample sequence number corresponding to a point cloud frame (also referred to as a sample) in point cloud media. Meanings of the syntax shown in the foregoing Table 2 are as follows: SaliencyInfoBox is a saliency information data box, and some embodiments temporarily does not describe SaliencyInfoBox. Refer to the following description in some embodiments corresponding to FIG. 9. SaliencyInfoBox is included in a sample entry (MetaDataSampleEntry) of a saliency information metadata track.

In Table 2, default_saliency_flag is a saliency level indication field, and a value is a 1-bit unsigned integer. When the value of the field is a fourth indication value (for example, 1), a point cloud frame has a default saliency level (the default saliency level is 0), for example, the saliency level of the point cloud frame is determined by a reference saliency level parameter. When the value of this field is a fifth indication value (for example, 0 in Table 2), the saliency level of the point cloud frame is determined by SaliencyInfoStruct in a sample. In some embodiments, values of the fourth indication value and the fifth indication value are not limited, provided that the two indication values are different.

unified_saliency_level in Table 2 is an effective range indication field, and a value is a 1-bit unsigned integer. When the value of the field is a sixth indication value (for example, 1), a saliency level parameter indicated in a current sample takes effect in a saliency information metadata track, for example, all saliency level parameters in the saliency information metadata track are indicated by the same standard. When the value of the field is a seventh indication value (for example, 0 in Table 2), the saliency level parameter indicated in the current sample only takes effect in the current sample (point cloud frame). In some embodiments, values of the sixth indication value and the seventh indication value are not limited, provided that the two indication values are different.

In Table 2, sample_saliency_level is a sample saliency level parameter, a value is an 8-bit unsigned integer, and this field is configured for indicating a saliency level of a sample.

In Table 2, num_saliency_struct is a data structure quantity field, a value is a 16-bit unsigned integer, and this field is configured for indicating a total quantity of saliency information data structures. When the value of the field is greater than 1, the point cloud frame includes at least two spatial regions. Therefore, a value of spatial_info_flag in SaliencyInfoStruct is to be the first indication value.

By using the saliency information metadata track, the server may determine a saliency level parameter corresponding to each point cloud frame (for example, a sample). In point cloud media, if some point cloud frames have the same saliency level parameter, or spatial regions in some point cloud frames have the same saliency level parameter, another implementation is provided in some embodiments, and saliency information is indicated by using a media file encapsulation sample group tool (referred to as a saliency information sample group in some embodiments). Both the saliency information sample group and the saliency information metadata track include dynamic information in the saliency information, for example, a saliency level parameter that changes with time, and static information in the saliency information, for example, an algorithm type for obtaining the saliency level parameter, is included in a saliency information data box. In a case that the media file includes a saliency information sample group for indicating the saliency information, the saliency information data box may be included at a sample entry of a point cloud track corresponding to the point cloud media. The dynamic information and the static information in the saliency information may be set according to an actual application scene.

For ease of understanding, refer to Table 3. Table 3 is configured for indicating syntax of a saliency information sample group structure according to some embodiments.

TABLE 3

```
aligned(8) class SaliencyInfoGroupEntry( ) extends VolumetricVisualSampleGroup-
Entry ('saig') {
    unsigned int(1) unified_saliency_level;
    bit(7) reserved;
    if(unified_saliency_level = 0){
        unsigned_int(8) sample_saliency_level;
    }
    unsigned int(16) num_saliency_struct;
    for (i=0; i < num_saliency_struct; i++) {
        SaliencyInfoStruct( );
    }
}
```

In the saliency information sample group, only point cloud frames that do not have the reference saliency level parameter are organized in the form of a sample group, and a saliency level parameter of one or more point cloud frames is given. Therefore, a point cloud frame that does not belong to the saliency information sample group is a point cloud frame that has the reference saliency level parameter.

Meanings of the syntax shown in the foregoing Table 3 are as follows: unified_saliency_level is an effective range indication field, and when a value is a sixth indication value (for example, 1 in Table 3), a saliency level parameter indicated in a saliency information sample group takes effect in a point cloud track corresponding to point cloud media, for example, all saliency level parameters in the point cloud track are indicated by using the same standard. When the value of the field is a seventh indication value (for example, 0), the saliency level parameter indicated in the saliency information sample group takes effect only in the saliency information sample group.

sample_saliency_level in Table 3 indicates saliency levels of all samples included in the saliency information sample group.

num_saliency_struct in Table 3 indicates a total quantity of saliency information data structures. When a value of this field is greater than 1, a point cloud frame in the saliency information sample group includes at least two spatial regions. Therefore, the value of spatial_info_flag in SaliencyInfoStruct is to be the first indication value.

In conclusion, when the saliency information of the point cloud media changes with time, some embodiments may provide two implementations to indicate the saliency information. One implementation is a saliency information metadata track, and the other implementation is a saliency information sample group.

Referring to FIG. 7 again, the saliency information in the first point cloud media is only related to time and not related to a spatial region. In this case, in the media file corresponding to the first point cloud media, the server may generate a first saliency information metadata track. The first saliency information metadata track may be shown in Table 4. Table 4 is a saliency information metadata track structure table according to some embodiments.

TABLE 4

```
DynamicSaliencyInfoSampleEntry:

SaliencyInfoBox:
{ saliency_algorithm_type = 1; num_saliency_struct = 0}
DynamicSaliencyInfoSample:
{sample1: default_saliency_flag = 1; unified_saliency_level = 1}
{sample2:default_saliency_flag = 0; unified_saliency_level = 1;
num_saliency_struct = 1;
SaliencyInfoStruct:{ saliency_level = 2; spatial_info_flag = 0}}
{sample3:default_saliency_flag = 0; unified_saliency_level = 1;
num_saliency_struct = 1;
SaliencyInfoStruct:{ saliency_level = 1; spatial_info_flag = 0}}
...
{sampleE: default_saliency_flag = 1; unified_saliency_level = 1}
``` saliency_algorithm_type in Table 4 is a saliency algorithm type field, and when a value is a first type value (for example, 1 in Table 4), a saliency level parameter is obtained by means of data statistics. num_saliency_struct=0 indicates that no spatial region with saliency that does not change with time exists in the first saliency information metadata track. For meanings of other fields in Table 4, refer to descriptions in Table 1 to Table 2.

Referring to FIG. 8 again, the saliency information in the second point cloud media is related to a spatial region, and the saliency level of the spatial region changes with time. In this case, in the media file corresponding to the second point cloud media, the server may generate a second saliency information metadata track. The second saliency information metadata track is shown in Table 5. Table 5 is another saliency information metadata track structure table according to some embodiments.

TABLE 5

```
DynamicSaliencyInfoSampleEntry:

SaliencyInfoBox:
{ saliency_algorithm_type = 1; num_saliency_struct = 0}
DynamicSaliencyInfoSample:
{sample1:default_saliency_flag = 0; unified_saliency_level = 1; num_saliency_struct = 2;
SaliencyStruct1:{ saliency_level = 2; spatial_info_flag = 1; region_id_ref_flag = 1;
slice_info_flag = 1; spatial_region_id = 1; num_slices = 2; slice_id = 0,1}
SaliencyStruct2:{ saliency_level = 1; spatial_info_flag = 1; region_id_ref_flag = 1;
slice_info_flag = 1; spatial_region_id = 2; num_slices = 2; slice_id = 2,3}
}
```

TABLE 5-continued

| DynamicSaliencyInfoSampleEntry: |
|---|

```
{sample2:default_saliency_flag = 0; unified_saliency_level = 1; num_saliency_struct = 1;
SaliencyInfoStruct:{ saliency_level = 2; spatial_info_flag = 0}}
{sample3:default_saliency_flag = 0; unified_saliency_level = 1; num_saliency_struct = 2;
SaliencyStruct1:{ saliency_level = 0; spatial_info_flag = 1; region_id_ref_flag = 1;
slice_info_flag = 1; spatial_region_id = 1; num_slices = 2; slice_id = 0,1}
SaliencyStruct2:{ saliency_level = 1; spatial_info_flag = 1; region_id_ref_flag = 1;
slice_info_flag = 1; spatial_region_id = 2; num_slices = 2; slice_id = 2,3}
}
{sample4: default_saliency_flag = 1; unified_saliency_level = 1}
...
{sampleE: default_saliency_flag = 1; unified_saliency_level = 1}
```

Compared with Table 4, in Table 5, there are some sample sequence numbers, for example, a sample 1 and a sample 3, and a point cloud frame corresponding thereto is divided into multiple spatial regions. For example, a point cloud frame 1 corresponding to the sample 1 has two spatial regions, a saliency level of the first spatial region is 2, and a saliency level of the second spatial region is 1. For meanings of the fields in Table 5, refer to descriptions in Table 1, Table 2, and Table 4.

The server encapsulates a point cloud code stream into a media file, and indicates the foregoing information in a form of metadata (for example, a dynamic saliency information metadata track) in the media file. Because the point cloud saliency information changes with time, transmission signaling does not include saliency information description data. However, the saliency information metadata track exists in the transmission signaling as a media resource in a form of representation. It may be learned from FIG. 5 that there are two modes in which the server transmits a point cloud file to the client:

1) A client C1 downloads a complete point cloud file (for example, a media file) and plays it locally.
2) A client C2 establishes streaming transmission with the server, and performs presentation and consumption while receiving a point cloud file segment Fs.

It may be learned that, in some embodiments, saliency information that is corresponding to point cloud media and that is configured for indicating a time range or saliency information that is corresponding to point cloud media and that is configured for indicating a spatial range may be determined. Therefore, in some embodiments, the saliency information of the point cloud media and a point cloud code stream can be encapsulated together to obtain a media file. In addition, in the saliency information indication method provided in some embodiments, precision of the saliency information of the point cloud media can be improved, and further, when the point cloud media is rendered, a rendering effect of a target range can be determined by using precise saliency information, thereby optimizing the rendering effect of the point cloud media.

Further, referring to FIG. 9, FIG. 9 is a schematic flowchart of another media data processing method according to some embodiments. The method may be performed by a content production device (for example, the content production device 200A in some embodiments corresponding to FIG. 5) in an immersive media system. For example, the content production device may be a server. In some embodiments, execution by the server is used as an example for description. The method may include at least the following operations 201 to 204:

Operation 201: Determine saliency information of point cloud media; the saliency information including a saliency level parameter configured for indicating a target range of the point cloud media; and the target range including at least one of a spatial range or a time range.

In some embodiments, for an obtaining process and a production process of the point cloud media, refer to the foregoing description in FIG. 5. The saliency information in some embodiments may include two types of information. One type of information is saliency algorithm information, for example, information for obtaining a saliency level parameter. The other type of information is a saliency level parameter configured for indicating a target range.

Saliency level parameters corresponding to different point cloud media is to be associated with different ranges. Therefore, some embodiments provide a saliency information indication method for immersive media, including point cloud media. In this method, several descriptive fields are added to a system layer, including field extensions at a file encapsulation layer and a transmission signaling layer. The following provides an example in which an extended ISOBMFF data box, DASH signaling, and SMT signaling are used.

The point cloud media may include third point cloud media. A saliency level parameter corresponding to the third point cloud media may be only related to a spatial region, and is not related to time. Referring to FIG. 10 together, FIG. 10 is a schematic diagram in which a saliency level parameter is related to a spatial region, and a saliency level parameter related to a spatial region does not change with time according to some embodiments. It is assumed that the third point cloud media includes A point cloud frames, A is a positive integer, and an internal structure of each point cloud frame in the A point cloud frames is shown in FIG. 10. Therefore, according to content of the third point cloud media, the server may define saliency information of each region of the third point cloud media, where a saliency level parameter of the first spatial region (referred to as a spatial region 1) of each point cloud frame is 2 and includes two point cloud slices, and point cloud slice identifiers respectively corresponding to the two point cloud slices include a point cloud slice 0 and a point cloud slice 1. A saliency level parameter of a second spatial region (referred to as a spatial region 2) of each point cloud frame is 1, and includes two point cloud slices, and point cloud slice identifiers respectively corresponding to the two point cloud slices include a point cloud slice 2 and a point cloud slice 3.

Therefore, in the third point cloud media, the spatial region 1 has higher saliency, and the spatial region 2 has lower saliency. In this case, the server may generate a saliency information data box, which is configured for indicating saliency information that does not change with time in a point cloud track corresponding to the point cloud media.

For a scene in which the saliency information changes with time, refer to the foregoing description of operation 101 in some embodiments corresponding to FIG. 4.

Operation 202: Encode the point cloud media to obtain a point cloud code stream.

In some embodiments, optimization encoding is performed on the target range of the point cloud media according to the saliency level parameter in the saliency information to obtain the point cloud code stream.

A total quantity of target ranges is at least two, and the at least two target ranges include a first target range and a second target range; the saliency level parameter in the saliency information includes a first saliency level parameter corresponding to the first target range and a second saliency level parameter corresponding to the second target range; and a process of performing optimization encoding on the target range of the point cloud media according to a saliency level parameter in the saliency information to obtain the point cloud code stream may include: determining a first encoding level of the first target range according to the first saliency level parameter, and determining a second encoding level of the second target range according to the second saliency level parameter, where in a case that the first saliency level parameter is greater than the second saliency level parameter, the first encoding level is superior to the second encoding level; performing optimization encoding on the first target range by using the first encoding level to obtain a first sub-point cloud code stream, and performing optimization encoding on the second target range by using the second encoding level to obtain a second sub-point cloud code stream; and generating the point cloud code stream according to the first sub-point cloud code stream and the second sub-point cloud code stream.

To improve encoding efficiency and a presentation effect, in some embodiments, optimization encoding may be performed on the point cloud media by using the saliency information of the point cloud media. The process is as follows: The server determines saliency level parameters respectively corresponding to the at least two target ranges, sorts the at least two saliency level parameters, sets an encoding level of a target range corresponding to the maximum saliency level parameter to the maximum encoding level, sets an encoding level of a target range corresponding to the second highest saliency level parameter to the second highest encoding level, for example, performs forward sorting on the encoding levels respectively corresponding to the at least two target ranges according to sorting of the at least two saliency level parameters, and performs optimization encoding on the target range according to the encoding level corresponding to the target range to obtain the point cloud code stream.

The foregoing optimization encoding process may be performed by the content production device, or based on the content production device generating the media file and transmitting the media file to an intermediate node, the intermediate node first decapsulates and decodes the media file to obtain the point cloud media, and performs optimization encoding on the point cloud media according to the saliency information of the point cloud media.

Operation 203: Encapsulate the point cloud code stream and the saliency information into a media file.

In some embodiments, the media file includes a saliency information data box configured for indicating the saliency information, and in a case that a sample entry of a point cloud track corresponding to the media file includes the saliency information data box, the target range includes the spatial range; one saliency level parameter in the saliency information is configured for indicating one spatial range; the one spatial range includes one spatial region included in each point cloud frame of A point cloud frames; the point cloud media includes A point cloud frames; and A is a positive integer.

The saliency information data box includes a data structure quantity field; and the data structure quantity field is configured for indicating a total quantity of saliency information data structures.

A value of the data structure quantity field is S, representing S saliency information data structures; the S saliency information data structures include a saliency information data structure Be, S and c are both positive integers, and c is less than or equal to S; the saliency information data structure Be includes a saliency level field whose field value is a saliency level parameter De and a target range indication field whose field value is a first indication value; the saliency level parameter De belongs to a saliency level parameter in the saliency information; and the first indication value represents that the saliency level parameter De is configured for indicating a saliency level of a spatial range.

The saliency information data structure Be further includes a spatial range indication field; in a case that a field value of the spatial range indication field is a second indication value, a spatial range indicated by the saliency level parameter. is determined by a spatial region identifier; in a case that the field value of the spatial range indication field is a third indication value, the spatial range indicated by the saliency level parameter, is determined by spatial region location information; and the third indication value is different from the second indication value.

In a case that the field value of the spatial range indication field is the second indication value, the saliency information data structure Be further includes a spatial region identifier field; and the spatial region identifier field is configured for indicating a spatial region identifier of the spatial range indicated by the saliency level parameter $D_c$.

In a case that the field value of the spatial range indication field is the third indication value, the saliency information data structure Be further includes a spatial region location information field; and the spatial region location information field is configured for indicating spatial region location information of the spatial range indicated by the saliency level parameter $D_c$.

The saliency information data structure Be further includes a point cloud slice information field; in a case that a field value of the point cloud slice information field is a first information value, the spatial range indicated by the saliency level parameter $D_c$ has an associated point cloud slice; in a case that the field value of the point cloud slice information field is a second information value, the spatial range indicated by the saliency level parameter $D_c$ does not have an associated point cloud slice; the second information value is different from the first information value; in a case that the field value of the point cloud slice information field is the first information value, the saliency information data structure Be further includes a point cloud slice quantity field and a point cloud slice identifier field; the point cloud slice quantity field is configured for indicating a total quantity of associated point cloud slices; and the point cloud slice identifier field is configured for indicating a point cloud slice identifier corresponding to the associated point cloud slice.

The saliency information data structure Be further includes a spatial tile information field; in a case that a field value of the spatial tile information field is a third information value, the spatial range indicated by the saliency level parameter $D_c$ has an associated spatial tile; in a case that the field value of the point cloud slice information field is a fourth information value, the spatial range indicated by the saliency level parameter $D_c$ has no associated spatial tile; the fourth information value is different from the third information value; in a case that the field value of the spatial tile information field is the third information value, the saliency information data structure $B_c$ further includes a spatial tile quantity field and a spatial tile identifier field; the spatial tile quantity field is configured for indicating a total quantity of associated spatial tiles; and the spatial tile identifier field is configured for indicating a spatial tile identifier corresponding to the associated spatial tile.

The saliency information data box includes a saliency algorithm type field; and in a case that a field value of the saliency algorithm type field is a first type value, the saliency information is determined by a saliency detection algorithm; in a case that the field value of the saliency algorithm type field is a second type value, the saliency information is determined by data statistics; and the second type value is different from the first type value.

Some embodiments may provide saliency information of point cloud media by using a saliency information data structure. When the saliency information of the point cloud media is only related to a spatial region, the server may generate a saliency information data box in a media file, so as to indicate saliency information that does not change with time. Referring to Table 6, Table 6 is configured for indicating syntax of a saliency information data box structure according to some embodiments.

TABLE 6

```
aligned(8) class SaliencyInfoBox( ) extends fullbox ('saif') {
    unsigned int(8) saliency_algorithm_type;
    unsigned int(16) num_saliency_struct;
    for (i=0; i < num_saliency_struct; i++) {
        SaliencyInfoStruct( );
    }
}
```

The saliency information data box may be included in a sample entry of a point cloud track, so as to indicate saliency information that is in the point cloud track and does not change with time, and a quantity thereof is 0 or 1. In a scene in which the point cloud media has multiple point cloud tracks, the saliency information data box may be located at a sample entry of any point cloud track.

Meanings of the syntax shown in the foregoing Table 6 are as follows: saliency_algorithm_type is a saliency algorithm type field, and is configured for indicating an algorithm type for obtaining saliency information. When a value of the field is a first type value (for example, 0), saliency information is obtained by using an algorithm. When the value of the field is a second type value (for example, 1), saliency information is obtained by means of subjective evaluation and statistics, for example, data statistics. The rest values can be extended by an application itself.

In Table 6, num_saliency_struct is a data structure quantity field, indicating a quantity of saliency information data structures. When a value of this field is greater than 0, the value of spatial_info_flag in SaliencyInfoStruct is to be 1. When the value of the field is 0, no spatial region with saliency that does not change with time exists in the point cloud track.

In conclusion, when the saliency information of the point cloud media is only related to the spatial region, and does not change with time, the server may provide a saliency information data box to indicate the saliency information. Referring to FIG. 10 again, in the media file corresponding to the third point cloud media, the server may generate a saliency information data box. The saliency information data box may be shown in Table 7. Table 7 is a saliency information data box structure table according to some embodiments.

TABLE 7

```
SaliencyInfoBox:
{ saliency_algorithm_type = 1; num_saliency_struct = 2
SaliencyStruct1:{ saliency_level = 2; spatial_info_flag = 1;
region_id_ref_flag = 1;
slice_info_flag = 1; spatial_region_id = 1; num_slices = 2;
slice_id = 0,1}
SaliencyStruct2:{ saliency_level = 1; spatial_info_flag = 1;
region_id_ref_flag = 1;
slice_info_flag = 1; spatial_region_id = 2; num_slices = 2;
slice_id = 2,3}
}
```

For meanings of the fields in Table 7, refer to descriptions in Table 1 and Table 6 in the foregoing.

Further, the server encapsulates the point cloud code stream into a point cloud file, and indicates the saliency information in a form of metadata (for example, a SaliencyInfoBox data box) in the file.

Operation 204: Transmit transmission signaling for the media file to a client; the transmission signaling carries saliency information description data; the saliency information description data is configured for instructing the client to determine an obtaining order between different media sub-files in the media file when obtaining the media file in a streaming transmission mode; and the saliency information description data is generated based on the saliency information.

Not only several descriptive fields are added to the file encapsulation layer, but also several descriptive fields are added to the transmission signaling layer. In the following, DASH signaling and SMT signaling are used as examples. The saliency information description data includes a saliency information descriptor defined in the DASH signaling and a saliency information descriptor defined in the SMT signaling, which is described below.

Some embodiments extends the DASH signaling, and proposes a saliency information descriptor, where the saliency information descriptor (SaliencyInfo descriptor) is a supplemental (SupplementalProperty) element, and property @schemeIdUri thereof is "urn: avs: ims: 2022:apcc". The descriptor may exist at an adaptation set level or a representation level. When the descriptor exists at the adaptation set level, the saliency information descriptor describes all representations in an adaptation set. When the descriptor exists at the representation level, the saliency information descriptor describes a corresponding representation. SaliencyInfoDescriptor descriptor indicates a related property of the saliency information of the point cloud media. For a property, refer to Table 8. Table 8 is configured for indicating an element and a property of the saliency information descriptor according to some embodiments.

TABLE 8

| Element and property of the SaliencyInfo descriptor | Use | Data type | Description |
|---|---|---|---|
| SaliencyInfo | 0..N | avs:ims:2022:apcc | A property of the element indicates a property related to saliency information of a corresponding representation or adaptation set. |
| SaliencyInfo@ saliencyLevel | M | xs:unsignedShort | Indicates a saliency level parameter, and a higher value of the field indicates higher saliency. |
| SaliencyInfo@regionIdRefFlag | M | xs:bool | When a value of the field is 1, a spatial region corresponding to the saliency level parameter is indexed by a spatial region identifier. When the value of the field is 0, the spatial region corresponding to the saliency level parameter is directly indicated by spatial region location information. |
| SaliencyInfo@spatialRegionId | CM | xs:unsignedInt | When a value of regionIdRefFlag is 1, this field is a mandatory field. The value of this field is a spatial region identifier. |
| SaliencyInfo@anchorPoint | CM | xs:vector<float> | When the value of regionIdRefFlag is 0, this field is a mandatory field. The value of the field is a three-dimensional vector, and vector components respectively represent x, y, and z coordinates of a spatial region anchor. |
| SaliencyInfo@boundingBox | CM | xs:vector<float> | When the value of regionIdRefFlag is 0, this field is a mandatory field. The value of the field is a three-dimensional vector, and vector components respectively represent lengths of a spatial region along coordinate axes x, y, and z. |
| SaliencyInfo@sliceId | O | xs:vector<int> | This field indicates identifiers of one or more point cloud slices associated with a spatial region. |
| SaliencyInfo@tileId | O | xs:vector<int> | This field indicates identifiers of one or more point cloud spatial tiles associated with a spatial region. |

N in Table 8 represents a total quantity of saliency level parameters in saliency information. As shown in FIG. 10, N=2 indicates that there are two saliency level parameters. M indicates that a field (for example, SaliencyInfo@ saliencyLevel in Table 8) corresponding thereto is a mandatory field. CM represents a field (for example, Saliency-Info@spatialRegionId in Table 8) corresponding thereto is a conditional mandatory field. O represents that a field (for example, SaliencyInfo@tileId in Table 8) corresponding thereto is an optional field.

In Table 8, unsigned represents no sign, Short represents a short integer type, bool represents a Boolean type variable, Int represents an integer type, vector represents a vector, and float represents a floating point type.

In another feasible transmission signaling extension, some embodiments extends in SMT signaling, and proposes a saliency information descriptor, which exists at a representation level and is configured for describing a corresponding media resource and indicating saliency information of the media resource. Referring to Table 9, Table 9 is configured for indicating a saliency information descriptor syntax according to some embodiments.

TABLE 9

| Syntax | Value | Bits | Remarks |
|---|---|---|---|
| Saliency_info_descriptor( ) { | | | |
| descriptor_tag | | 16 | uimsbf |
| descriptor_length | | 32 | uimsbf |
| saliency_info_level | | 16 | uimsbf |
| region_id_ref_flag | | 1 | bool |
| if(region_id_ref_flag == 1){ | | | |
| spatial_region_id | | 16 | uimsbf |
| } | | | |
| else{ | | | |
| anchor_point_x; | | 32 | uimsbf |
| anchor_point_y; | | 32 | uimsbf |
| anchor_point_z; | | 32 | uimsbf |
| bounding_box_x; | | 32 | uimsbf |
| bounding_box_y; | | 32 | uimsbf |
| bounding_box_z; | | 32 | uimsbf |
| } | | | |
| related_tile_info_flag | | 1 | bool |
| related_slice_info_flag | | 1 | bool |
| reserved | | 5 | uimsbf |
| if(related_tile_info_flag==1){ | | | |

TABLE 9-continued

| Syntax | Value | Bits | Remarks |
|---|---|---|---|
| num_tiles; | | 16 | uimsbf |
| for(i=0;i<N1;i++){ | N1 | | |
| tile_id; | | 16 | uimsbf |
| } | | | |
| } | | | |
| if(related_slice_info_flag==1){ | | | |
| num_slices; | | 16 | uimsbf |
| for(i=0;i<N2;i++){ | N2 | | |
| slice_id; | | 16 | uimsbf |
| } | | | |
| } | | | |
| } | | | |

Meanings of the syntax shown in Table 9 are as follows: Saliency_info_level indicates a saliency level, and a higher value of the field indicates higher saliency. Region_id_ref_ flag is a spatial range indication field, and when a value of the field is a first indication value (for example, 1), a spatial region corresponding to a saliency level is indexed by a spatial region identifier. When the value of the field is an eighth indication value (for example, 0), the spatial region corresponding to the saliency level is directly indicated by spatial region location information. Spatial_region_id is a spatial region identifier field, indicating a spatial region identifier. Anchor_point_x, y, z indicates x, y, and z coordinates of a spatial region anchor. Bounding_box_x, y, z indicates lengths of a spatial region along x, y, and z axes. When a value of Related_tile_info_flag is a third information value (for example, 1), a spatial region associated with a saliency level parameter is associated with one or more spatial tiles. When the value is a fourth information value (for example, 0), the spatial region associated with the saliency level has no spatial tile related thereto. When a value of Related_slice_info_flag is a first information value (for example, 1), the spatial region associated with the saliency level is associated with one or more point cloud slices. When the value is a second information value (for example, 0), the spatial region associated with the saliency level has no point cloud slice related thereto. Num_tiles indicates a quantity of spatial tiles associated with the spatial region. Tile_id indicates an identifier of the associated spatial tile. Num_slices indicates a quantity of point cloud slices associated with the spatial region. Slice_id indicates an identifier of the associated point cloud slice. For meanings of the foregoing fields, references may also be made to the foregoing description in Table 1.

When the saliency level parameter in the saliency information changes with time, the saliency information of the point cloud media exists in the media file in a form of a metadata track or a sample group. In this case, the saliency information descriptor or the saliency information descriptor is not included in the transmission signaling, but the saliency information metadata track or the saliency information sample group will exist in the transmission signaling in a form of a representation as a media resource.

When the saliency information of the point cloud media is associated with the spatial region and does not change with time, as shown in the third point cloud media in FIG. 10, in this case, the server associates the saliency information with spatial information in the transmission signaling, generates signaling, and transmits the signaling to the client. For the third point cloud media shown in FIG. 10, the transmission signaling generated by the server includes two saliency information descriptors:

SaliencyInfo descriptor1:
SaliencyInfo@saliencyLevel=2;
 SaliencyInfo@regionIdRefFlag=1;
SaliencyInfo@spatialRegionId=1;
 SaliencyInfo@sliceId=0, 1;
SaliencyInfo descriptor2:
SaliencyInfo@saliencyLevel=1;
 SaliencyInfo@regionIdRefFlag=1;
SaliencyInfo@spatialRegionId=2;
 SaliencyInfo@sliceId=2, 3.

For the third point cloud media shown in FIG. 10, when streaming transmission is established with the server, for the client, if the spatial region 1 and the spatial region 2 are corresponding to different media resources Representation1 and Representation2, because the spatial region 1 has higher saliency, the client may preferentially ensure transmission of Representation1 during transmission.

Some embodiments provides a saliency information indication method for immersive media, including point cloud media. In some embodiments, at a file encapsulation layer and a signaling transmission layer, saliency information of different ranges and saliency information obtaining algorithms of different types are defined, and the saliency information and spatial information are associated at a signaling layer. Therefore, saliency information of different spatial regions and different point cloud frames in the point cloud media can be more flexibly indicated, so as to meet more point cloud application scenes, so that a server can perform encoding optimization according to the saliency information, and a client can perform transmission optimization according to the saliency information.

Further, referring to FIG. 11, FIG. 11 is a schematic flowchart of still another media data processing method according to some embodiments. The method may be performed by a content consumption device (for example, the content consumption device 200B in some embodiments corresponding to FIG. 5) in an immersive media system. For example, the content consumption device may be a terminal integrated with a client (for example, a video client). The method may include at least the following operations 301 and 302:

Operation 301: Obtain a media file, and decapsulate the media file to obtain a point cloud code stream and saliency information of the point cloud media; the saliency information including a saliency level parameter configured for indicating a target range of the point cloud media; and the target range including at least one of a spatial range or a time range.

In some embodiments, the client may obtain the media file of the immersive media sent by the server, and decapsulate the media file, so as to obtain the point cloud code stream and the saliency information of the point cloud media in the media file. A decapsulation process is reversed to an encapsulation process, and the client may decapsulate the media file according to a file format used during encapsulation, so as to obtain the point cloud code stream. For a process of generating and transmitting the media file by the server, refer to the foregoing embodiment corresponding to FIG. 4.

Operation 302: Decode the point cloud code stream to obtain the point cloud media.

In some embodiments, it is determined that the target range includes the spatial range in a case that the media file includes a saliency information data box configured for indicating the saliency information; one saliency level parameter in the saliency information is configured for indicating one spatial range; the one spatial range includes one spatial region included in each point cloud frame of A point cloud frames; the point cloud media includes A point cloud frames; and A is a positive integer.

A total quantity of spatial ranges is at least two, and the at least two spatial ranges include a first spatial range and a second spatial range; a rendering process may further include: obtaining a saliency level parameter $O_p$ and a saliency level parameter $O_{p+1}$ from the saliency information, the saliency level parameter $O_p$ being configured for indicating the first spatial range, and the saliency level parameter $O_{p+1}$ being configured for indicating the second spatial range; p being a positive integer, and p being less than a total quantity of saliency level parameters in the saliency information; determining that a rendering level corresponding to the first spatial range is superior to a rendering level corresponding to the second spatial range in a case that the saliency level parameter $O_p$ is greater than the saliency level parameter $O_{p+1}$; and determining that the rendering level corresponding to the second spatial range is superior to the rendering level corresponding to the first spatial range in a case that the saliency level parameter $O_p$ is less than the saliency level parameter $O_{p+1}$.

In some embodiments, in a case that the media file includes a saliency information metadata track configured for indicating the saliency information, it is determined that the target range includes the time range; the saliency information metadata track includes E sample sequence numbers associated with the saliency information; one sample sequence number corresponds to one point cloud frame; the point cloud media includes E point cloud frames; and E is a positive integer.

The time range includes a first point cloud frame and a second point cloud frame in the E point cloud frames; and a rendering process may further include: obtaining a saliency level parameter $Q_r$ and a saliency level parameter $Q_{r+1}$ from the saliency information, the saliency level parameter $Q_r$ being configured for indicating the first point cloud frame, and the saliency level parameter $Q_{r+1}$ being configured for indicating the second point cloud frame; r being a positive integer and r being less than a total quantity of saliency level parameters in the saliency information; determining that a rendering level corresponding to the first point cloud frame is superior to a rendering level corresponding to the second point cloud frame in a case that the saliency level parameter $Q_r$ is greater than the saliency level parameter $Q_{r+1}$; and determining that the rendering level corresponding to the second point cloud frame is superior to the rendering level corresponding to the first point cloud frame in a case that the saliency level parameter $Q_r$ is less than the saliency level parameter $Q_{r+1}$.

The rendering process may further include: obtaining, from the saliency information, a saliency level parameter $X_y$ corresponding to a first spatial region, and obtaining a saliency level parameter $X_{y+1}$ corresponding to a second spatial region in a case that the first point cloud frame includes at least two spatial regions, and the at least two spatial regions respectively correspond to different saliency levels; both the first spatial region and the second spatial region belonging to the at least two spatial regions; and x being a positive integer, and x being less than the total quantity of saliency level parameters in the saliency information; determining that a rendering level corresponding to the first spatial region is superior to a rendering level corresponding to the second spatial region in a case that the saliency level parameter $X_y$ is greater than the saliency level parameter $X_{y+1}$; and determining that the rendering level corresponding to the second spatial region is superior to the rendering level corresponding to the first spatial region in a case that the saliency level parameter $X_y$ is less than the saliency level parameter $X_{y+1}$.

A decoding process is reversed to an encoding process, and the client may decode the point cloud code stream according to a file format used during encoding, so as to obtain the point cloud media.

Based on decapsulating and decoding a point cloud file/file segment, the client may flexibly allocate a computing resource in a process of presenting and rendering the point cloud media according to the saliency information of the point cloud media, so as to optimize a presentation effect of the target range. In the first point cloud media shown in FIG. 5, sample2 is a point cloud frame with the highest saliency, sample3 is a point cloud frame with the second highest saliency, and the rest samples have only an initial saliency level parameter (which may be set to 0). Therefore, rendering of sample2 and sample3 by the client may be more refined, for example, a rendering level is in a positive relationship with a saliency level.

Referring to the second point cloud media shown in FIG. 8, sample2 is a frame with the highest saliency, there is a spatial region with the highest saliency and a spatial region with the second highest saliency in sample1, there is a spatial region with the second highest saliency in sample3, and the rest samples have only default saliency, for example, a reference saliency level parameter. Therefore, rendering of the spatial regions with the highest saliency and the spatial region with the second highest saliency in sample2 and sample1 and the spatial region with the second highest saliency in sample3 by the client may be more refined. For example, a rendering level corresponding to sample2 is superior to a rendering level corresponding to sample1, and in sample1, a rendering level corresponding to the spatial region with the highest saliency is superior to a rendering level corresponding to the spatial region with the second highest saliency. The rendering level corresponding to sample1 is superior to a rendering level corresponding to sample3.

Referring to the third point cloud media shown in FIG. 10, the spatial region 1 is a region with relatively high saliency. Therefore, rendering of the spatial region 1 by the client may be more refined, for example, a rendering level corresponding to the spatial region 1 is superior to a rendering level corresponding to the spatial region 2.

In conclusion, in some embodiments, saliency information of different spatial regions and different point cloud frames in the point cloud media can be more flexibly indicated, so as to meet more point cloud application scenes, so that a server can perform encoding optimization according to the saliency information, and a client can perform transmission optimization according to the saliency information. In a presentation and rendering process, the client may flexibly allocate a computing resource according to the saliency information to optimize a presentation effect of a region.

Figure 12:
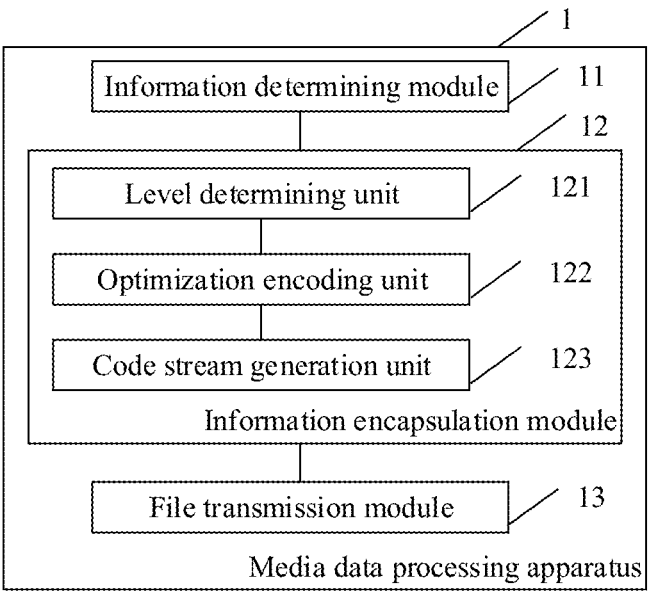
FIG. 12 is a schematic structural diagram of a media data processing apparatus according to some embodiments.

Referring to FIG. 12, FIG. 12 is a schematic structural diagram of a media data processing apparatus according to some embodiments. The media data processing apparatus may be a computer program (including program code) running on a content production device. For example, the media data processing apparatus is application software in the content production device. The apparatus may be configured to perform corresponding operations in the media data processing method provided in some embodiments. As shown in FIG. 12, the media data processing apparatus 1 may include: an information determining module 11 and an information encapsulation module 12.

The information determining module 11 is configured to determine saliency information of point cloud media; the saliency information including a saliency level parameter configured for indicating a target range of the point cloud media; and the target range including at least one of a spatial range or a time range; and the information encapsulation module 12 is configured to encode the point cloud media to obtain a point cloud code stream, and encapsulate the point cloud code stream and the saliency information into a media file.

For an implementation of the information determining module 11 and the information encapsulation module 12, refer to operation 101 and operation 102 in some embodiments corresponding to FIG. 4.

In an implementation, the media file includes a saliency information data box configured for indicating the saliency information, and in a case that a sample entry of a point cloud track corresponding to the media file includes the saliency information data box, the target range includes the spatial range;

one saliency level parameter in the saliency information is configured for indicating one spatial range; the one spatial range includes one spatial region included in each point cloud frame of A point cloud frames; the point cloud media includes A point cloud frames; and A is a positive integer.

In one implementation, the saliency information data box includes a data structure quantity field; and the data structure quantity field is configured for indicating a total quantity of saliency information data structures.

In an implementation, a value of the data structure quantity field is S, representing S saliency information data structures; the S saliency information data structures include a saliency information data structure $B_c$, S and c are both positive integers, and c is less than or equal to S;

the saliency information data structure $B_c$ includes a saliency level field whose field value is a saliency level parameter $D_c$ and a target range indication field whose field value is a first indication value; the saliency level parameter $D_c$ belongs to a saliency level parameter in the saliency information; and the first indication value represents that the saliency level parameter $D_c$ is configured for indicating a saliency level of a spatial range.

In an implementation, the saliency information data structure $B_c$ further includes a spatial range indication field;

in a case that a field value of the spatial range indication field is a second indication value, a spatial range indicated by the saliency level parameter e is determined by a spatial region identifier;

in a case that the field value of the spatial range indication field is a third indication value, the spatial range indicated by the saliency level parameter c is determined by spatial region location information; and the third indication value is different from the second indication value.

In an implementation, in a case that the field value of the spatial range indication field is the second indication value, the saliency information data structure $B_c$ further includes a spatial region identifier field; and the spatial region identifier field is configured for indicating a spatial region identifier of the spatial range indicated by the saliency level parameter $D_c$.

In an implementation, in a case that the field value of the spatial range indication field is the third indication value, the saliency information data structure $B_c$ further includes a spatial region location information field; and the spatial region location information field is configured for indicating spatial region location information of the spatial range indicated by the saliency level parameter $D_c$.

In an implementation, the saliency information data structure $B_c$ further includes a point cloud slice information field;

in a case that a field value of the point cloud slice information field is a first information value, the spatial range indicated by the saliency level parameter $D_c$ has an associated point cloud slice;

in a case that the field value of the point cloud slice information field is a second information value, the spatial range indicated by the saliency level parameter $D_c$ does not have an associated point cloud slice; the second information value is different from the first information value;

in a case that the field value of the point cloud slice information field is the first information value, the saliency information data structure $B_c$ further includes a point cloud slice quantity field and a point cloud slice identifier field; the point cloud slice quantity field is configured for indicating a total quantity of associated point cloud slices; and the point cloud slice identifier field is configured for indicating a point cloud slice identifier corresponding to the associated point cloud slice.

In an implementation, the saliency information data structure $B_c$ further includes a spatial tile information field;

in a case that a field value of the spatial tile information field is a third information value, the spatial range indicated by the saliency level parameter $D_c$ has an associated spatial tile;

in a case that the field value of the point cloud slice information field is a fourth information value, the spatial range indicated by the saliency level parameter $D_c$ has no associated spatial tile; the fourth information value is different from the third information value;

in a case that the field value of the spatial tile information field is the third information value, the saliency information data structure $B_c$ further includes a spatial tile quantity field and a spatial tile identifier field; the spatial tile quantity field is configured for indicating a total quantity of associated spatial tiles; and the spatial tile identifier field is configured for indicating a spatial tile identifier corresponding to the associated spatial tile.

In an implementation, the saliency information data box includes a saliency algorithm type field; and in a case that a field value of the saliency algorithm type field is a first type value, the saliency information is determined by a saliency detection algorithm;

in a case that the field value of the saliency algorithm type field is a second type value, the saliency information is determined by data statistics; and the second type value is different from the first type value.

Referring to FIG. 12, the media data processing apparatus 1 may further include: a file transmission module 13.

The file transmission module 13 is configured to transmit transmission signaling for the media file to a client; the transmission signaling carries saliency information description data; the saliency information description data is configured for instructing the client to determine an obtaining order between different media sub-files in the media file when obtaining the media file in a streaming transmission mode; and the saliency information description data is generated based on the saliency information.

For an implementation of the file transmission module 13, refer to operation 204 in some embodiments corresponding to FIG. 9.

In an implementation, in a case that the media file includes a saliency information metadata track configured for indicating the saliency information, the target range includes the time range;

the saliency information metadata track includes E sample sequence numbers associated with the saliency information; one sample sequence number corresponds to one point cloud frame; the point cloud media includes E point cloud frames; and E is a positive integer.

In an implementation, the saliency information metadata track includes a sample sequence number $F_g$; g is a positive integer and g is less than or equal to E; the time range includes a point cloud frame corresponding to the sample sequence number $F_g$;

the saliency information metadata track includes a saliency level indication field for the sample sequence number $F_g$;

in a case that a field value of the saliency level indication field is a fourth indication value, a saliency level associated with the sample sequence number $F_g$ is determined by a reference saliency level parameter; the reference saliency level parameter belongs to a saliency level parameter in the saliency information;

in a case that the field value of the saliency level indication field is a fifth indication value, the saliency level associated with the sample sequence number $F_g$ is determined by a saliency information data structure; and the fifth indication value is different from the fourth indication value.

In an implementation, in a case that the field value of the saliency level indication field is the fourth indication value, the reference saliency level parameter is configured for indicating a saliency level of a time range; the time range is a point cloud frame corresponding to the sample sequence number $F_g$;

the saliency information metadata track further includes an effective range indication field whose field value for the sample sequence number $F_g$ is a sixth indication value;

and the sixth indication value represents that the reference saliency level parameter takes effect in the saliency information metadata track.

In an implementation, in a case that the field value of the saliency level indication field is the fifth indication value, the saliency information metadata track further includes an effective range indication field for the sample sequence number $F_g$;

in a case that a field value of the effective range indication field is a sixth indication value, the saliency level associated with the sample sequence number $F_g$ takes effect in the saliency information metadata track;

in a case that the field value of the effective range indication field is a seventh indication value, the saliency level associated with the sample sequence number $F_g$ takes effect in the point cloud frame corresponding to the sample sequence number $F_g$; and the seventh indication value is different from the sixth indication value.

In an implementation, in a case that the field value of the effective range indication field is the seventh indication value, the saliency information metadata track further includes a sample saliency level field for the sample sequence number $F_g$; and the sample saliency level field is configured for indicating a saliency level parameter of the point cloud frame corresponding to the sample sequence number $F_g$.

In an implementation, in a case that the field value of the saliency level indication field is the fifth indication value, the saliency information metadata track further includes a data structure quantity field whose field value for the sample sequence number $F_g$ is T; the data structure quantity field is configured for indicating a total quantity of saliency information data structures; and T is a positive integer.

In an implementation, T saliency information data structures include a saliency information data structure $U_v$, v is a positive integer, and v is less than or equal to T;

the saliency information data structure $U_v$ includes a saliency level field whose field value is a saliency level parameter $W_y$, and a target range indication field; the saliency level parameter $W_y$ belongs to a saliency level parameter in the saliency information;

in a case that a field value of the target range indication field is a first indication value, the saliency level parameter $W_y$ is configured for indicating a saliency level of a spatial region in the point cloud frame corresponding to the sample sequence number $F_g$;

in a case that the field value of the target range indication field is an eighth indication value, the saliency level parameter $W_y$ is configured for indicating the saliency level of the point cloud frame corresponding to the sample sequence number $F_g$; and the eighth indication value is different from the first indication value.

In an implementation, in a case that T is a positive integer greater than 1, the saliency information data structure includes a saliency level field and a target range indication field whose field value is the first indication value; a field value of the saliency level field belongs to a saliency level parameter in the saliency information; and the first indication value represents that the field value of the saliency level field is configured for indicating a saliency level of a spatial region in the point cloud frame corresponding to the sample sequence number $F_g$.

In an implementation, a sample entry of the saliency information metadata track includes a saliency information data box;

the saliency information data box includes a saliency algorithm type field; and the saliency algorithm type field is configured for indicating a determined algorithm type of the saliency information.

In an implementation, in a case that the media file includes Z saliency information sample groups configured for indicating the saliency information, the target range includes the time range;

a total quantity of sample sequence numbers separately included in the Z saliency information sample groups is less than or equal to H, and the sample sequence numbers separately included in the Z saliency information sample groups are different from each other; one sample sequence number is configured for indicating one point cloud frame; the media file includes H point cloud frames; and H is a positive integer, Z is a positive integer, and Z is less than H.

In an implementation, the Z saliency information sample groups include a saliency information sample group $K_m$; m is a positive integer and m is less than or equal to Z; the time range includes a point cloud frame corresponding to the saliency information sample group $K_m$; the point cloud frame corresponding to the saliency information sample group $K_m$ belongs to the H point cloud frames;

the saliency information sample group $K_m$ includes an effective range indication field and a data structure quantity field whose field value is 1; the data structure quantity field is configured for indicating a total quantity of saliency information data structures; and I is a positive integer; I saliency information data structures are configured for indicating a saliency level associated with the saliency information sample group $K_m$;

in a case that a field value of the effective range indication field is a sixth indication value, the saliency level associated with the saliency information sample group $K_m$ takes effect in a point cloud track corresponding to the media file;

in a case that the field value of the effective range indication field is a seventh indication value, the saliency level associated with the saliency information sample group $K_m$ takes effect within the saliency information sample group $K_m$; and the seventh indication value is different from the sixth indication value.

In an implementation, in a case that the field value of the effective range indication field is the seventh indication value, the saliency information sample group $K_m$ further includes a sample saliency level field; and the sample saliency level field is configured for indicating a saliency level parameter of the point cloud frame corresponding to the saliency information sample group $K_m$.

In an implementation, the I saliency information data structures include a saliency information data structure $J_n$, n is a positive integer, and n is less than or equal to I;

the saliency information data structure $J_n$ includes a saliency level field whose field value is a saliency level parameter $L_n$ and a target range indication field; the saliency level parameter $L_n$ belongs to a saliency level parameter in the saliency information;

in a case that a field value of the target range indication field is a first indication value, the saliency level parameter $L_n$ is configured for indicating a saliency level of a spatial region in the point cloud frame corresponding to the saliency information sample group $K_m$;

in a case that the field value of the target range indication field is an eighth indication value, the saliency level parameter $L_n$ is configured for indicating a saliency level of the point cloud frame corresponding to the saliency information sample group $K_m$; and the eighth indication value is different from the first indication value.

Referring to FIG. 12, the information encapsulation module 12 is configured to perform optimization encoding on the target range of the point cloud media according to a saliency level parameter in the saliency information to obtain the point cloud code stream.

For an implementation of the information encapsulation module 12, refer to operation 202 in some embodiments corresponding to FIG. 9.

Referring to FIG. 12, a total quantity of target ranges is at least two, and the at least two target ranges include a first target range and a second target range; the saliency level parameter in the saliency information includes a first saliency level parameter corresponding to the first target range and a second saliency level parameter corresponding to the second target range; and the information encapsulation module 12 may include: a level determining unit 121, an optimization encoding unit 122, and a code stream generation unit 123.

The level determining unit 121 is configured to: determine a first encoding level of the first target range according to the first saliency level parameter, and determine a second encoding level of the second target range according to the second saliency level parameter, where in a case that the first saliency level parameter is greater than the second saliency level parameter, the first encoding level is superior to the second encoding level;

the optimization encoding unit 122 is configured to: perform optimization encoding on the first target range by using the first encoding level to obtain a first sub-point cloud code stream, and perform optimization encoding on the second target range by using the second encoding level to obtain a second sub-point cloud code stream; and the code stream generation unit 123 is configured to generate the point cloud code stream according to the first sub-point cloud code stream and the second sub-point cloud code stream.

For an implementation of the level determining unit 121, the optimization encoding unit 122, and the code stream generation unit 123, refer to operation 202 in some embodiments corresponding to FIG. 9.

Some embodiments provides a saliency information indication method for immersive media, including point cloud media. In some embodiments, at a file encapsulation layer and a signaling transmission layer, saliency information of different ranges and saliency information obtaining algorithms of different types are defined, and the saliency information and spatial information are associated at a signaling layer. Therefore, saliency information of different spatial regions and different point cloud frames in the point cloud media can be more flexibly indicated, so as to meet more point cloud application scenes, so that a server can perform encoding optimization according to the saliency information, and a client can perform transmission optimization according to the saliency information.

Figure 13:
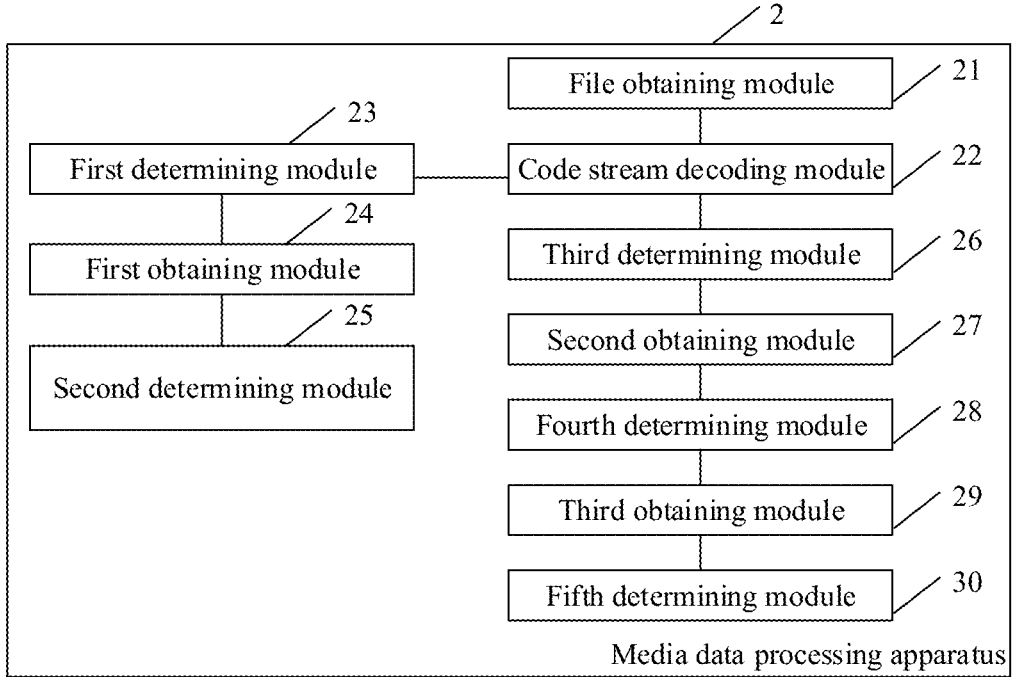
FIG. 13 is a schematic structural diagram of another media data processing apparatus according to some embodiments.

Referring to FIG. 13, FIG. 13 is a schematic structural diagram of another media data processing apparatus according to some embodiments. The media data processing apparatus may be a computer program (including program code) running on a content consumption device. For example, the media data processing apparatus is application software (for example, a video client) in the content consumption device. The apparatus may be configured to perform corresponding operations in the media data processing method provided in some embodiments. As shown in FIG. 13, the media data processing apparatus 2 may include: a file obtaining module 21 and a code stream decoding module 22.

The file obtaining module 21 is configured to obtain a media file, and decapsulating the media file to obtain a point cloud code stream and saliency information of the point cloud media; the saliency information including a saliency level parameter configured for indicating a target range of the point cloud media; and the target range including at least one of a spatial range or a time range; and the code stream decoding module 22 is configured to decode the point cloud code stream to obtain the point cloud media.

For an implementation of the file obtaining module 21 and the code stream decoding module 22, refer to operation 301 and operation 302 in some embodiments corresponding to FIG. 11.

Referring to FIG. 13, the media data processing apparatus 2 may further include: a first determining module 23.

The first determining module 23 is configured to: determine that the target range includes the spatial range in a case that the media file includes a saliency information data box configured for indicating the saliency information; one saliency level parameter in the saliency information is configured for indicating one spatial range; the one spatial range includes one spatial region included in each point cloud frame of A point cloud frames; the point cloud media includes A point cloud frames; and A is a positive integer.

For an implementation of the first determining module 23, refer to operation 302 in some embodiments corresponding to FIG. 5.

Referring to FIG. 13, a total quantity of spatial ranges is at least two, and the at least two spatial ranges include a first spatial range and a second spatial range; and the media data processing apparatus 2 may further include: a first obtaining module 24 and a second determining module 25.

The first obtaining module 24 is configured to obtain a saliency level parameter $O_p$ and a saliency level parameter $O_{p+1}$ from the saliency information, the saliency level parameter $O_p$ being configured for indicating the first spatial range, and the saliency level parameter $O_{p+1}$ being configured for indicating the second spatial range; p being a positive integer, and p being less than a total quantity of saliency level parameters in the saliency information;

the second determining module 25 is configured to: determine that a rendering level corresponding to the first spatial range is superior to a rendering level corresponding to the second spatial range in a case that the saliency level parameter $O_p$ is greater than the saliency level parameter $O_{p+1}$; and the second determining module 25 is further configured to: determine that the rendering level corresponding to the second spatial range is superior to the rendering level corresponding to the first spatial range in a case that the saliency level parameter $O_p$ is less than the saliency level parameter $O_{p+1}$.

For an implementation of the first obtaining module 24 and the second determining module 25, refer to operation 302 in some embodiments corresponding to FIG. 11.

Referring to FIG. 13, the media data processing apparatus 2 may further include: a third determining module 26.

The third determining module 26 is configured to: in a case that the media file includes a saliency information metadata track configured for indicating the saliency information, determine that the target range includes the time range;

the saliency information metadata track includes E sample sequence numbers associated with the saliency information; one sample sequence number corresponds to one point cloud frame; the point cloud media includes E point cloud frames; and E is a positive integer.

For an implementation of the third determining module 26, refer to operation 302 in some embodiments corresponding to FIG. 11.

Referring to FIG. 13, the time range includes a first point cloud frame and a second point cloud frame in the E point cloud frames; and the media data processing apparatus 1 may further include: a second obtaining module 27 and a fourth determining module 28.

The second obtaining module 27 is configured to obtain a saliency level parameter $Q_r$ and a saliency level parameter $Q_{r+1}$ from the saliency information, the saliency level parameter $Q_r$ being configured for indicating the first point cloud frame, and the saliency level parameter $Q_{r+1}$ being configured for indicating the second point cloud frame; r being a positive integer and r being less than a total quantity of saliency level parameters in the saliency information;

the fourth determining module 28, configured to: determine that a rendering level corresponding to the first point cloud frame is superior to a rendering level corresponding to the second point cloud frame in a case that the saliency level parameter $Q_r$ is greater than the saliency level parameter $Q_{r+1}$; and the fourth determining module 28 is further configured to: determine that the rendering level corresponding to the second point cloud frame is superior to the rendering level corresponding to the first point cloud frame in a case that the saliency level parameter $Q_r$ is less than the saliency level parameter $Q_{r+1}$.

For an implementation of the second obtaining module 27 and the fourth determining module 28, refer to operation 302 in some embodiments corresponding to FIG. 11.

Referring to FIG. 13, the media data processing apparatus 2 may further include: a third obtaining module 29 and a fifth determining module 30.

The third obtaining module 29 is configured to: obtain, from the saliency information, a saliency level parameter $X_y$ corresponding to a first spatial region, and obtain a saliency level parameter $X_{y+1}$ corresponding to a second spatial region in a case that the first point cloud frame includes at least two spatial regions, and the at least two spatial regions respectively correspond to different saliency levels; both the first spatial region and the second spatial region belonging to the at least two spatial regions; and x being a positive integer, and x being less than the total quantity of saliency level parameters in the saliency information;

the fifth determining module 30 is configured to: determine that a rendering level corresponding to the first spatial region is superior to a rendering level corresponding to the second spatial region in a case that the saliency level parameter $X_y$ is greater than the saliency level parameter $X_{y+1}$; and the fifth determining module 30 is further configured to: determine that the rendering level corresponding to the second spatial region is superior to the rendering level corresponding to the first spatial region in a case that the saliency level parameter $X_y$ is less than the saliency level parameter $X_{y+1}$.

For an implementation of the third obtaining module 29 and the fifth determining module 30, refer to operation 302 in some embodiments corresponding to FIG. 11.

In some embodiments, saliency information of different spatial regions and different point cloud frames in the point cloud media can be more flexibly indicated, so as to meet more point cloud application scenes, so that a server can perform encoding optimization according to the saliency information, and a client can perform transmission optimization according to the saliency information. In a presentation and rendering process, the client may flexibly allocate a computing resource according to the saliency information to optimize a presentation effect of a region.

Figure 14:
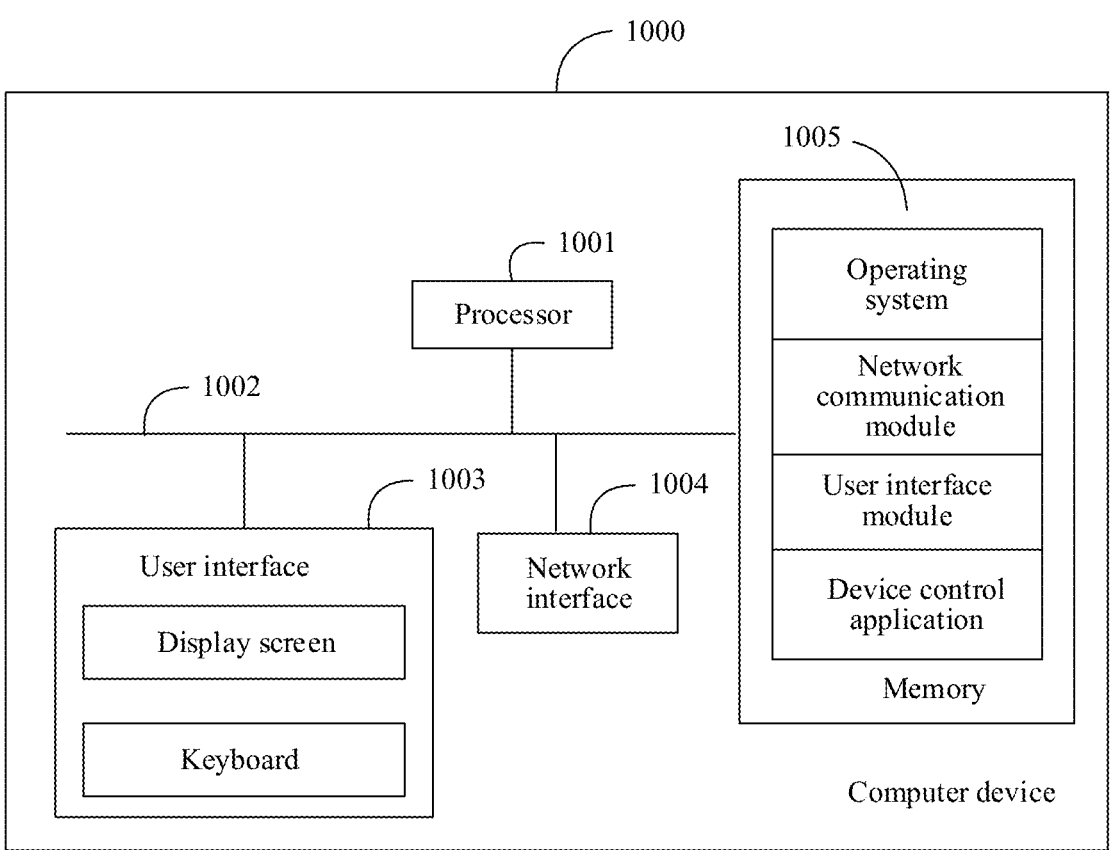
FIG. 14 is a schematic structural diagram of a computer device according to some embodiments.

Referring to FIG. 14, FIG. 14 is a schematic structural diagram of a computer device according to some embodiments. As shown in FIG. 14, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between these components. The user interface 1003 may include a display and a keyboard. In one embodiment, the user interface 1003 may further include a standard wired interface and wireless interface. In some embodiments, the network interface 1004 may include a standard wired interface and wireless interface (for example, a Wi-Fi interface). The memory 1005 may be a high-speed RAM memory, or may be a non-volatile memory, for example, at least one magnetic disk memory. In some embodiments, the memory 1005 may be at least one storage apparatus that is located far away from the foregoing processor 1001. As shown in FIG. 14, the memory 1005 used as a computer readable storage medium may include an operating system, a network communication module, a user interface module, and a device-control application program.

According to some embodiments, each module or unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. In actual applications, these functions may also be realized cooperatively by the other units, and may be realized cooperatively by multiple units.

A person skilled in the art would understand that these "modules" "units" could be implemented by hardware logic, a processor or processors executing computer software code, or a combination of both. The "modules" or "units" may also be implemented in software stored in a memory of a computer or a non-transitory computer-readable medium, where the instructions of each unit are executable by a processor to thereby cause the processor to perform the respective operations of the corresponding unit.

In the computer device 1000 shown in FIG. 14, the network interface 1004 may provide a network communication function. The user interface 1003 is mainly configured to provide an input interface for a user. The processor 1001 may be configured to invoke the device-control application program stored in the memory 1005. The computer device 1000 described in some embodiments may execute descriptions of the data processing method or apparatus in some embodiments.

Some embodiments further provides a computer device, including: a processor, a memory, and a network interface. The processor is connected to the memory and the network interface, the network interface is configured to provide a data communication function, the memory is configured to store a computer program, and the processor is configured to invoke the computer program, so that the computer device performs descriptions of the media data processing method or apparatus in some embodiments.

Some embodiments further provides a computer readable storage medium. The computer readable storage medium stores a computer program. When the computer program is executed by a processor, descriptions of the media data processing method or apparatus in some embodiments are implemented.

The foregoing computer readable storage medium may be the media data processing apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. Further, the computer readable storage medium may further include an internal storage unit of the computer device and an external storage device. The computer readable storage medium is configured to store the computer program and other programs and data by the computer device. The computer readable storage medium may be further configured to temporarily store data that has been or is to be output.

Some embodiments further provides a computer program product, where the computer program product includes a computer program, and the computer program is stored in a computer readable storage medium. A processor of a computer device reads the computer program from the computer readable storage medium, and the processor executes the computer program, so that the computer device can perform descriptions of the media data processing method or apparatus in some embodiments.

Figure 15:
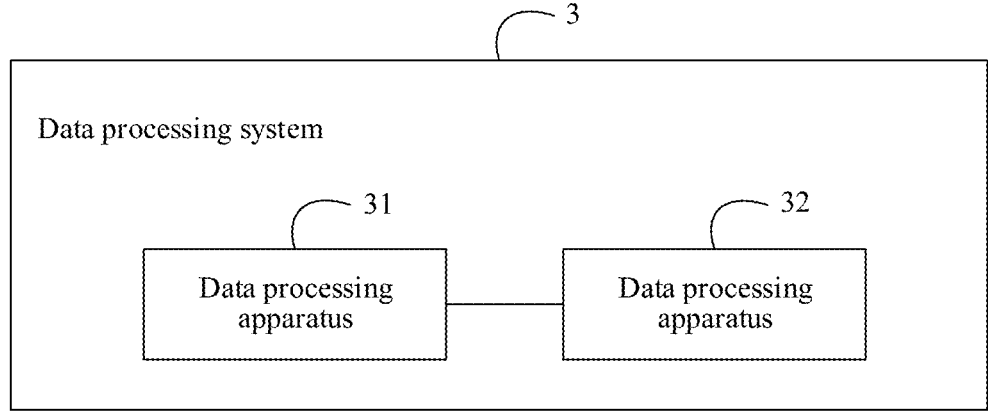
FIG. 15 is a schematic structural diagram of a data processing system according to some embodiments.

Further, referring to FIG. 15, FIG. 15 is a schematic architecture diagram of a data processing system according to some embodiments. The data processing system 3 may include a data processing apparatus 31 and a data processing apparatus 32. The data processing apparatus 31 may be the media data processing apparatus 1 in some embodiments corresponding to FIG. 12. The data processing apparatus 31 may be integrated into the content production device 200A in some embodiments corresponding to FIG. 5. The data processing apparatus 32 may be the media data processing apparatus 2 in some embodiments corresponding to FIG. 13. The data processing apparatus 32 may be integrated into the content consumption device 200B in some embodiments corresponding to FIG. 5.

The terms "first" and "second," claims, and accompanying drawings of some embodiments are configured for distinguishing between different objects, and are not configured for describing a specific sequence. In addition, the term "include" and any variant thereof are intended to cover a non-exclusive inclusion. For example, a process, method, apparatus, product, or device that includes a series of operations or units is not limited to the listed operations or modules; and instead, in some embodiments, further includes an operation or module that is not listed, or in some embodiments, further includes another operation or unit that is intrinsic to the process, method, apparatus, product, or device.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in some embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A media data processing method, performed by a computer device, comprising:

acquiring point cloud media;

determining saliency information of the point cloud media, the saliency information comprising a saliency level parameter indicating a target range of the point cloud media;

encoding the point cloud media to obtain a point cloud code stream; and encapsulating the point cloud code stream and the saliency information into a media file, wherein the target range comprises at least one of a spatial range or a time range,

wherein the saliency information is included in a saliency information data box within a sample entry of a point cloud track of the media file when the target range comprises the spatial range and not the time range, wherein the saliency information is included in a saliency information metadata track different from the point cloud track when the target range comprises the time range and not the spatial range, and wherein the saliency information metadata track comprises a spatial region identifier corresponding to the spatial range when the target range comprises both the spatial range and the time range.

2. The method according to claim 1, wherein the saliency information data box indicates the saliency information, wherein a first saliency level parameter of the saliency information indicates one spatial range, wherein the one spatial range comprises one spatial region, wherein the point cloud media comprises one or more point cloud frames, and wherein one or more of the one or more point cloud frames comprise the one spatial range.

3. The method according to claim 2, wherein the saliency information data box comprises a data structure quantity field, and wherein the data structure quantity field indicates a total quantity of saliency information data structures.

4. The method according to claim 3, wherein a value of the data structure quantity field is S, representing S saliency information data structures, wherein the S saliency information data structures comprise a saliency information data structure $B_c$, wherein c indicates an index, wherein S and c are both positive integers, and c is less than or equal to S, wherein the saliency information data structure $B_c$ comprises a saliency level field, wherein the saliency level field comprises a saliency level parameter $D_c$ and a target range field, wherein the target range field is a first value, wherein the saliency level parameter $D_c$ corresponds to a second saliency level parameter of the saliency information, wherein the first value references the saliency level parameter $D_c$, and wherein the saliency level parameter $D_c$ indicates a saliency level of the spatial range.

5. The method according to claim 4, wherein the saliency information data structure $B_c$ further comprises a first spatial range field, wherein, based on the first spatial range field being a second value, a first spatial range indicated by the saliency level parameter $D_c$ is determined based on a spatial region identifier, wherein, based on the first spatial range field being a third value, the first spatial range is determined based on spatial region location information, and wherein the third value is different than the second value.

6. The method according to claim 5, wherein based on the first spatial range field being the second value, the saliency information data structure $B_c$ further comprises a spatial region identifier field, and wherein the spatial region identifier field indicates a first spatial region identifier of the first spatial range.

7. The method according to claim 5, wherein based on the first spatial range field being the third value, the saliency information data structure $B_c$ further comprises a spatial region location information field, and wherein the spatial region location information field indicates spatial region location information of the first spatial range.

8. The method according to claim 5, wherein the saliency information data structure $B_c$ further comprises a point cloud slice information field, wherein, based on the point cloud slice information field being a first information value, the first spatial range corresponds to a point cloud slice, wherein, based on the point cloud slice information field being a second information value, the first spatial range does not have an associated point cloud slice, and the second information value is different from the first information value, wherein, based on the point cloud slice information field is the first information value, the saliency information data structure $B_c$ further comprises a point cloud slice quantity field and a point cloud slice identifier field, the point cloud slice quantity field is configured for indicating a total quantity of associated point cloud slices, and the point cloud slice identifier field is configured for indicating a point cloud slice identifier corresponding to the associated point cloud slice.

9. The method according to claim 8, wherein the saliency information data structure $B_c$ further comprises a spatial tile information field, wherein, based on the spatial tile information field being a third information value, the first spatial range has an associated spatial tile, wherein, based on the point cloud slice information field being a fourth information value, the first spatial range has no associated spatial tile, and the fourth information value is different from the third information value, wherein, based on the spatial tile information field being the third information value, the saliency information data structure $B_c$ further comprises a spatial tile quantity field and a spatial tile identifier field, the spatial tile quantity field is configured for indicating a total quantity of associated spatial tiles, and the spatial tile identifier field is configured for indicating a spatial tile identifier corresponding to the associated spatial tile.

10. The method according to claim 2, wherein the saliency information data box comprises a saliency algorithm type field, wherein, based on the saliency algorithm type field being a first type value, the saliency information is determined by a saliency detection algorithm, and wherein, based on the saliency algorithm type field being a second type value, the saliency information is determined based on data statistics, and the second type value is different from the first type value.

11. A media data processing apparatus, comprising:

at least one memory configured to store computer program code; and at least one processor configured to read the program code and operate as instructed by the program code, the program code comprising:

acquiring code configured to cause at least one of the at least one processor to acquire point cloud media;

determining code configured to cause at least one of the at least one processor to determine saliency information of the point cloud media, the saliency information comprising a saliency level parameter indicating a target range of the point cloud media;

encoding code configured to cause at least one of the at least one processor to encode the point cloud media to obtain a point cloud code stream; and encapsulation code configured to cause at least one of the at least one processor to encapsulate the point cloud code stream and the saliency information into a media file, wherein the target range comprises at least one of a spatial range or a time range, wherein the saliency information is included in a saliency information data box within a sample entry of a point cloud track of the media file when the target range comprises the spatial range and not the time range, wherein the saliency information is included in a saliency information metadata track different from the point cloud track when the target range comprises the time range and not the spatial range, and wherein the saliency information metadata track comprises a spatial region identifier corresponding to the spatial range when the target range comprises both the spatial range and the time range.

12. The apparatus according to claim 11, wherein the saliency information data box indicates the saliency information, wherein a first saliency level parameter of the saliency information indicates one spatial range, wherein the one spatial range comprises one spatial region, wherein the point cloud media comprises one or more point cloud frames, and wherein one or more of the one or more point cloud frames comprise the one spatial range.

13. The apparatus according to claim 12, wherein the saliency information data box comprises a data structure quantity field, and wherein the data structure quantity field indicates a total quantity of saliency information data structures.

14. The apparatus according to claim 13, wherein a value of the data structure quantity field is S, representing S saliency information data structures, wherein the S saliency information data structures comprise a saliency information data structure $B_c$, wherein c indicates an index, wherein S and c are both positive integers, and c is less than or equal to S, wherein the saliency information data structure $B_c$ comprises a saliency level field, wherein the saliency level field comprises a saliency level parameter $D_c$ and a target range field, wherein the target range field is a first value, wherein the saliency level parameter $D_c$ corresponds to a second saliency level parameter of the saliency information, wherein the first value references the saliency level parameter $D_c$, and wherein the saliency level parameter $D_c$ indicates a saliency level of the spatial range.

15. The apparatus according to claim 14, wherein the saliency information data structure $B_c$ further comprises a first spatial range field, wherein, based on the first spatial range field being a second value, a first spatial range indicated by the saliency level parameter $D_c$ is determined based on a spatial region identifier, wherein, based on the first spatial range field being a third value, the first spatial range is determined based on spatial region location information, and wherein the third value is different than the second value.

16. The apparatus according to claim 15, wherein based on the first spatial range field being the second value, the saliency information data structure $B_c$ further comprises a spatial region identifier field, and wherein the spatial region identifier field indicates a first spatial region identifier of the first spatial range.

17. The apparatus according to claim 15, wherein based on the first spatial range field being the third value, the saliency information data structure $B_c$ further comprises a spatial region location information field, and wherein the spatial region location information field indicates spatial region location information of the first spatial range.

18. The apparatus according to claim 15, wherein the saliency information data structure $B_c$ further comprises a point cloud slice information field, wherein, based on the point cloud slice information field being a first information value, the first spatial range corresponds to a point cloud slice, wherein, based on the point cloud slice information field being a second information value, the first spatial range does not have an associated point cloud slice, and the second information value is different from the first information value, wherein, based on the point cloud slice information field is the first information value, the saliency information data structure $B_c$ further comprises a point cloud slice quantity field and a point cloud slice identifier field, the point cloud slice quantity field is configured for indicating a total quantity of associated point cloud slices, and the point cloud slice identifier field is configured for indicating a point cloud slice identifier corresponding to the associated point cloud slice.

19. The apparatus according to claim 18, wherein the saliency information data structure $B_c$ further comprises a spatial tile information field, wherein, based on the spatial tile information field being a third information value, the first spatial range has an associated spatial tile, wherein, based on the point cloud slice information field being a fourth information value, the first spatial range has no associated spatial tile, and the fourth information value is different from the third information value, wherein, based on the spatial tile information field being the third information value, the saliency information data structure $B_c$ further comprises a spatial tile quantity field and a spatial tile identifier field, the spatial tile quantity field is configured for indicating a total quantity of associated spatial tiles, and the spatial tile identifier field is configured for indicating a spatial tile identifier corresponding to the associated spatial tile.

20. A non-transitory computer readable storage medium, storing computer code which, when executed by at least one processor, causes the at least one processor to at least:

acquire point cloud media;

determine saliency information of the point cloud media, the saliency information comprising a saliency level parameter indicating a target range of the point cloud media;

encode the point cloud media to obtain a point cloud code stream; and encapsulate the point cloud code stream and the saliency information into a media file, wherein the target range comprises at least one of a spatial range or a time range, wherein the saliency information is included in a saliency information data box within a sample entry of a point cloud track of the media file when the target range comprises the spatial range and not the time range, wherein the saliency information is included in a saliency information metadata track different from the point cloud track when the target range comprises the time range and not the spatial range, and wherein the saliency information metadata track comprises a spatial region identifier corresponding to the spatial range when the target range comprises both the spatial range and the time range.

* * * * *